(12) United States Patent
Lan et al.

(10) Patent No.: US 11,108,352 B2
(45) Date of Patent: Aug. 31, 2021

(54) METHOD AND SYSTEM FOR CONTROLLING A MOTOR

(71) Applicant: SZ DJI TECHNOLOGY CO., LTD., Shenzhen (CN)

(72) Inventors: Qiu Lan, Shenzhen (CN); Changxing Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/132,766

(22) Filed: Sep. 17, 2018

(65) Prior Publication Data
US 2019/0020299 A1    Jan. 17, 2019

Related U.S. Application Data

(63) Continuation of application No. PCT/CN2016/077808, filed on Mar. 30, 2016.

(51) Int. Cl.
*H02P 21/22*     (2016.01)
*H02P 21/06*     (2016.01)
*H02P 21/36*     (2016.01)
*H02P 29/62*     (2016.01)
*B60L 15/20*     (2006.01)
*H02P 21/00*     (2016.01)

(52) U.S. Cl.
CPC ............. *H02P 29/62* (2016.02); *B60L 15/20* (2013.01); *B60L 2200/10* (2013.01); *B60L 2240/425* (2013.01); *B60L 2240/429* (2013.01); *B60L 2260/42* (2013.01); *H02P 21/0003* (2013.01); *Y02T 10/64* (2013.01)

(58) Field of Classification Search
CPC ........... H02P 21/22; H02P 25/08; H02P 23/14
See application file for complete search history.

(56) References Cited

U.S. PATENT DOCUMENTS

| 7,176,413 B2* | 2/2007 | Zanella ................... F03G 7/065 219/202 |
| 7,203,021 B1 | 4/2007 | Ryan et al. |
| 8,358,145 B1* | 1/2013 | Ferris ................... G11B 19/048 324/750.03 |
| 2008/0027591 A1* | 1/2008 | Lenser ................. G05D 1/0251 701/2 |
| 2010/0069216 A1 | 3/2010 | Ryu et al. |

(Continued)

FOREIGN PATENT DOCUMENTS

| CN | 1354479 A | 6/2002 |
| CN | 201797350 U | 4/2011 |

(Continued)

OTHER PUBLICATIONS

The World Intellectual Property Organization (WIPO) International Search Report and Written Opinion for PCT/CN2016/077808 dated Jan. 9, 2017 8 pages.

*Primary Examiner* — Kawing Chan
*Assistant Examiner* — Charles S Laughlin
(74) *Attorney, Agent, or Firm* — Anova Law Group, PLLC

(57) ABSTRACT

A method for controlling a motor configured to provide propulsion for a mobile platform includes determining whether to activate a preheat mode based on a temperature of a motor and, upon determining to activate the preheat mode, controlling a preheat current provided to the motor to enable self-preheating of the motor.

16 Claims, 22 Drawing Sheets

(56) References Cited

U.S. PATENT DOCUMENTS

| | | | |
|---|---|---|---|
| 2011/0190986 A1* | 8/2011 | Bitou | B62D 5/065 |
| | | | 701/41 |
| 2014/0018979 A1* | 1/2014 | Goossen | G05D 1/0044 |
| | | | 701/3 |
| 2017/0179869 A1* | 6/2017 | Sekiguchi | H02P 29/60 |

FOREIGN PATENT DOCUMENTS

| | | |
|---|---|---|
| CN | 102145711 A | 8/2011 |
| CN | 102147628 A | 8/2011 |
| CN | 102331936 A | 1/2012 |
| CN | 202550802 U | 11/2012 |
| CN | 102879084 A | 1/2013 |
| CN | 103195652 A | 7/2013 |
| CN | 103527502 A | 1/2014 |
| CN | 103576017 A | 2/2014 |
| CN | 103967794 A | 8/2014 |
| CN | 104518722 A | 4/2015 |
| CN | 104660133 A | 5/2015 |
| CN | 105429539 A | 3/2016 |
| TW | 201607234 A | 2/2016 |
| WO | 2013101847 A1 | 7/2013 |

\* cited by examiner

METHOD AND SYSTEM FOR CONTROLLING A MOTOR

CROSS-REFERENCE TO RELATED APPLICATION

This application is a continuation of International Application No. PCT/CN2016/077808, filed on Mar. 30, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to control systems and more particularly, but not exclusively, to systems and methods for controlling a motor.

BACKGROUND

A motor can convert one form of energy, such as electrical energy, into mechanical energy. The motor can be installed onboard a mobile platform, such as manned vehicle, unmanned vehicle, and robot, for the mobile platform to make movements. Unmanned aerial vehicle (UAV) is a type of unmanned vehicle that are used for performing surveillance, reconnaissance, and exploration tasks for various applications.

Operating a motor in a low-temperature environment can often be challenging. For example, at a low temperature, starting to propel a UAV can be difficult. The UAV may need a longer time to accelerate, which can lead to various problems, such as loss of control of flight attitude. Even after taking off, the UAV is more likely to crash at an early stage of a flight in the event of a collision. Reliability and safety is essential for mobile platform operation; so, improvement is desired in reliability and safety of the motor in the low-temperature environment.

In view of the foregoing, there is a need for methods and systems for controlling a motor that overcome the disadvantages of currently-available control methods and systems.

SUMMARY

In accordance with a first aspect disclosed herein, there is set forth a method for controlling a motor configured to provide propulsion for a mobile platform, including:

determining whether to activate a preheat mode based on a temperature of a motor; and upon determining to activate the preheat mode, controlling a preheat current provided to the motor to enable self-preheating of the motor.

In some embodiments of the disclosed method, the method further includes controlling a drive current provided to the motor in order for the motor to provide the propulsion, upon determining not to activate the preheat mode.

In some embodiments of the disclosed method, the method further includes:

determining to activate the preheat mode upon determining the temperature of the motor is less than a target temperature; and determining not to activate the preheat mode upon determining the temperature of the motor is greater than or equal to the target temperature.

In some embodiments of the disclosed method, the method further includes enabling the motor to generate an alert sound during the self-preheating.

In some embodiments of the disclosed method, the enabling the motor to generate the alert sound occurs simultaneously with the self-preheating.

In some embodiments of the disclosed method, the preheat current includes:

a Q-axis current for vibrating a rotor about a stator in the motor to generate the alert sound; and a D-axis current.

In some embodiments of the disclosed method, the Q-axis current and the D-axis current are converted to a three-phase supply current via an inverse direct-quadrature-zero transformation.

In some embodiments of the disclosed method, the Q-axis current is provided to the motor for a selected preheat duration based on the temperature of the motor.

In some embodiments of the disclosed method, an amplitude of the Q-axis current is selected to generate the alert sound at a target volume.

In some embodiments of the disclosed method, a frequency of the Q-axis current is selected to generate the alert sound at a target frequency.

In some embodiments of the disclosed method, the preheat current includes a D-axis current and a Q-axis current.

In some embodiments of the disclosed method, the Q-axis current is equal to zero.

In some embodiments of the disclosed method, the D-axis current and the Q-axis current are converted to a three-phase supply current via an inverse direct-quadrature-zero transformation.

In some embodiments of the disclosed method, the D-axis current is determined based on the temperature of the motor.

In some embodiments of the disclosed method, the D-axis current is determined by closed-loop control based on the temperature of the motor.

In some embodiments of the disclosed method, the D-axis current is calculated by using a proportional-integral (PI) model of the closed-loop control.

In some embodiments of the disclosed method, the D-axis current is calculated based on a proportion gain and an integral gain of the PI model.

In some embodiments of the disclosed method, the proportion gain is determined by:

controlling the self-preheating of the motor individually using a plurality of proportion gains; and selecting a proportion gain that raises the temperature of the motor to a steady state within a predetermined first time duration.

In some embodiments of the disclosed method, the integral gain is determined by:

controlling the self-preheating of the motor individually using a plurality of integral gains and the selected proportion gain; and selecting an integral gain that raises the temperature of the motor to the target temperature at the steady state and within a predetermined second time duration.

In some embodiments of the disclosed method, the D-axis current is determined by open-loop control based on the temperature of the motor.

In some embodiments of the disclosed method, the D-axis current is selected to increase the temperature of the motor to the target temperature within a target preheat duration.

In some embodiments of the disclosed method, the method further includes obtaining the temperature of the motor.

In some embodiments of the disclosed method, the temperature of the motor is obtained based on a resistance of the motor and a temperature-resistance correlation of the motor.

In some embodiments of the disclosed method, the temperature of the motor is obtained based on:

an environmental temperature measured via a temperature sensor; and a resistance of the motor and a temperature-resistance correlation of the motor.

In some embodiments of the disclosed method, the method further includes controlling conversion of an input current into the preheat current, wherein the input current is provided by a power device onboard the mobile platform.

In some embodiments of the disclosed method, the power device and the motor are preheated simultaneously.

In some embodiments of the disclosed method, the preheat current is less than or equal to a maximum current based on performance parameters of the power device.

In some embodiments of the disclosed method, the method further includes receiving a preheat request from a remote control device.

In some embodiments of the disclosed method, the method further includes:

determining whether to activate the preheat mode in response to the preheat request; and accepting the preheat request upon determining to activate the preheat mode; or rejecting the preheat request upon determining not to activate the preheat mode.

In some embodiments of the disclosed method, the method further includes notifying a remote control device of a preheat status of the motor.

In some embodiments of the disclosed method, the mobile platform includes an unmanned aerial vehicle (UAV).

In accordance with another aspect disclosed herein, there is set forth a system for controlling a motor configured to provide propulsion for a mobile platform, including:

a controller that operates to:

determine whether to activate a preheat mode based on a temperature of the motor; and upon determining to activate the preheat mode, control a preheat current provided to the motor to enable self-preheating of the motor.

In some embodiments of the disclosed system, the controller operates to control a drive current provided to the motor in order for the motor to provide the propulsion, upon determining not to activate the preheat mode.

In some embodiments of the disclosed system, the controller operates to:

determine to activate the preheat mode upon determining the temperature of the motor is less than a target temperature; and determine not to activate the preheat mode upon determining the temperature of the motor is greater than or equal to the target temperature.

In some embodiments of the disclosed system, the controller operates to enable the motor to generate an alert sound.

In some embodiments of the disclosed system, enabling the motor to generate the alert sound occurs simultaneously with the self-preheating.

In some embodiments of the disclosed system, the preheat current includes:

a Q-axis current for vibrating a rotor about a stator in the motor to generate the alert sound; and a D-axis current.

In some embodiments of the disclosed system, the Q-axis current and the D-axis current are converted to a three-phase supply current via an inverse direct-quadrature-zero transformation.

In some embodiments of the disclosed system, the Q-axis current is provided to the motor for a selected preheat duration based on the temperature of the motor.

In some embodiments of the disclosed system, an amplitude of the Q-axis current is selected to generate the alert sound at a target volume.

In some embodiments of the disclosed system, a frequency of the Q-axis current is selected to generate the alert sound at a target frequency.

In some embodiments of the disclosed system, the preheat current includes a D-axis current and a Q-axis current.

In some embodiments of the disclosed system, the Q-axis current is equal to zero.

In some embodiments of the disclosed system, the D-axis current and the Q-axis current are converted to a three-phase supply current via an inverse direct-quadrature-zero transformation.

In some embodiments of the disclosed system, the D-axis current is determined based on the temperature of the motor.

In some embodiments of the disclosed system, the D-axis current is determined by closed-loop control based on the temperature of the motor.

In some embodiments of the disclosed system, the D-axis current is calculated by using a proportional-integral (PI) model of the closed-loop control.

In some embodiments of the disclosed system, the D-axis current is calculated based on a proportion gain and an integral gain of the PI model.

In some embodiments of the disclosed system, the proportion gain is determined by:

controlling the self-preheating of the motor individually using a plurality of proportion gains; and selecting a proportion gain that raises the temperature of the motor to a steady state within a predetermined first time duration.

In some embodiments of the disclosed system, the integral gain is determined by:

controlling the self-preheating of the motor individually using a plurality of integral gains and the selected proportion gain; and selecting an integral gain that raises the temperature of the motor to the target temperature at the steady state and within a predetermined second time duration.

In some embodiments of the disclosed system, the D-axis current is determined by open-loop control based on the temperature of the motor.

In some embodiments of the disclosed system, the D-axis current is selected to increase the temperature of the motor to the target temperature within a target preheat duration.

In some embodiments of the disclosed system, the controller operates to obtain the temperature of the motor.

In some embodiments of the disclosed system, the controller operates to obtain the temperature of the motor based on a resistance of the motor and a temperature-resistance correlation of the motor.

In some embodiments of the disclosed system, the controller operates to obtain the temperature of the motor based on:

an environmental temperature measured via a temperature sensor; and a resistance of the motor and a temperature-resistance correlation of the motor.

In some embodiments of the disclosed system, the controller operates to control conversion of an input current into the preheat current, wherein the input current is provided by a power device onboard the mobile platform.

In some embodiments of the disclosed system, the power device and the motor are preheated simultaneously.

In some embodiments of the disclosed system, the preheat current is less than or equal to a maximum current based on performance parameters of the power device.

In some embodiments of the disclosed system, the controller operates to receive a preheat request from a remote control device.

In some embodiments of the disclosed system, the controller operates to:

determine whether to activate the preheat mode in response to the preheat request; and accept the preheat request upon determining to activate the preheat mode; or reject the preheat request upon determining not to activate the preheat mode.

In some embodiments of the disclosed system, the controller operates to notify a remote control device of a preheat status of the motor.

In some embodiments of the disclosed system, the mobile platform includes an unmanned aerial vehicle (UAV).

In accordance with another aspect disclosed herein, there is set forth a mobile platform, including:

a motor configured to provide propulsion for the mobile platform; and a controller that operates to:

determine whether to activate a preheat mode based on a temperature of the motor; and upon determining to activate the preheat mode, control a preheat current provided to the motor to enable self-preheating of the motor.

In some embodiments of the disclosed mobile platform, the controller operates to control a drive current provided to the motor in order for the motor to provide the propulsion, upon determining not to activate the preheat mode.

In some embodiments of the disclosed mobile platform, the controller operates to:

determine to activate the preheat mode upon determining the temperature of the motor is less than a target temperature; and determine not to activate the preheat mode upon determining the temperature of the motor is greater than or equal to the target temperature.

In some embodiments of the disclosed mobile platform, the controller operates to enable the motor to generate an alert sound during the self-preheating.

In some embodiments of the disclosed mobile platform, enabling the motor to generate the alert sound occurs simultaneously with the self-preheating.

In some embodiments of the disclosed mobile platform, the preheat current includes:

a Q-axis current for vibrating a rotor about a stator in the motor to generate the alert sound; and a D-axis current.

In some embodiments of the disclosed mobile platform, the Q-axis current and the D-axis current are converted to a three-phase supply current via an inverse direct-quadrature-zero transformation.

In some embodiments of the disclosed mobile platform, the Q-axis current is provided to the motor for a selected preheat duration based on the temperature of the motor.

In some embodiments of the disclosed mobile platform, an amplitude of the Q-axis current is selected to generate the alert sound at a target volume.

In some embodiments of the disclosed mobile platform, a frequency of the Q-axis current is selected to generate the alert sound at a target frequency.

In some embodiments of the disclosed mobile platform, the preheat current includes a D-axis current and a Q-axis current.

In some embodiments of the disclosed mobile platform, the Q-axis current is equal to zero.

In some embodiments of the disclosed mobile platform, the D-axis current and the Q-axis current are converted to a three-phase supply current via an inverse direct-quadrature-zero transformation.

In some embodiments of the disclosed mobile platform, the D-axis current is determined based on the temperature of the motor.

In some embodiments of the disclosed mobile platform, the D-axis current is determined by closed-loop control based on the temperature of the motor.

In some embodiments of the disclosed mobile platform, the D-axis current is calculated by using a proportional-integral (PI) model of the closed-loop control.

In some embodiments of the disclosed mobile platform, the D-axis current is calculated based on a proportion gain and an integral gain of the PI model.

In some embodiments of the disclosed mobile platform, the proportion gain is determined by:

controlling the self-preheating of the motor individually using a plurality of proportion gains; and selecting a proportion gain that raises the temperature of the motor to a steady state within a predetermined first time duration.

In some embodiments of the disclosed mobile platform, the integral gain is determined by:

controlling the self-preheating of the motor individually using a plurality of integral gains and the selected proportion gain; and selecting an integral gain that raises the temperature of the motor to the target temperature at the steady state and within a predetermined second time duration.

In some embodiments of the disclosed mobile platform, the D-axis current is determined by open-loop control based on the temperature of the motor.

In some embodiments of the disclosed mobile platform, the D-axis current is selected to increase the temperature of the motor to the target temperature within a target preheat duration.

In some embodiments of the disclosed mobile platform, the controller operates to obtain the temperature of the motor.

In some embodiments of the disclosed mobile platform, the temperature of the motor is obtained based on a resistance of the motor and a temperature-resistance correlation of the motor.

In some embodiments of the disclosed mobile platform, the temperature of the motor is obtained based on:

an environmental temperature measured via a temperature sensor; and a resistance of the motor and a temperature-resistance correlation of the motor.

In some embodiments of the disclosed mobile platform, the controller operates to control conversion of an input current into the preheat current, wherein the input current is provided by a power device onboard the mobile platform.

In some embodiments of the disclosed mobile platform, the power device and the motor are preheated simultaneously.

In some embodiments of the disclosed mobile platform, the preheat current is less than or equal to a maximum current based on performance parameters of the power device.

In some embodiments of the disclosed mobile platform, the controller operates to receive a preheat request from a remote control device.

In some embodiments of the disclosed mobile platform, the controller operates to:

determine whether to activate the preheat mode in response to the preheat request; and accept the preheat request upon determining to activate the preheat mode; or reject the preheat request upon determining not to activate the preheat mode.

In some embodiments of the disclosed mobile platform, the controller operates to notify a remote control device of a preheat status of the motor.

In some embodiments of the disclosed mobile platform, the mobile platform includes an unmanned aerial vehicle (UAV).

In accordance with another aspect disclosed herein, there is set forth a computer-readable storage medium including machine-executable code that, upon execution by one or more processors, controls a motor.

In accordance with another aspect disclosed herein, there is set forth a method for controlling a motor energized by a power device, including:

determining whether to activate a preheat mode based on a temperature of the power device; and upon determining to activate the preheat mode, controlling the power device to provide a preheat current to the motor, to enable simultaneous self-preheating of the motor and the power device.

In some embodiments of the disclosed method, the method further includes:

determining to activate the preheat mode upon determining the temperature of the power device is less than a target temperature; and determining not to activate the preheat mode upon determining the temperature of the power device is greater than or equal to the target temperature.

In some embodiments of the disclosed method, the method further includes obtaining the temperature of the power device.

In some embodiments of the disclosed method, the temperature of the power device is obtained based on:

an environmental temperature;

a surface temperature of battery cells in the power device; or a combination thereof.

In some embodiments of the disclosed method, the method further includes:

upon determining to activate the preheat mode, controlling the power device to supply a heating current to a heating element for heating the power device.

In some embodiments of the disclosed method, the heating element is located within the power device.

In some embodiments of the disclosed method, the heating element is located within a power device chamber accommodating the power device.

In some embodiments of the disclosed method, the method further includes enabling the motor to generate an alert sound.

In some embodiments of the disclosed method, enabling the motor to generate the alert sound occurs simultaneously with the self-preheating.

In some embodiments of the disclosed method, the preheat current includes:

a Q-axis current for vibrating a rotor about a stator in the motor to generate the alert sound; and a D-axis current.

In some embodiments of the disclosed method, the Q-axis current and the D-axis current are converted to a three-phase supply current via an inverse direct-quadrature-zero transformation.

In some embodiments of the disclosed method, the Q-axis current is provided to the motor for a selected preheat duration based on the temperature of the motor.

In some embodiments of the disclosed method, an amplitude of the Q-axis current is selected to generate the alert sound at a target volume.

In some embodiments of the disclosed method, a frequency of the Q-axis current is selected to generate the alert sound at a target frequency.

In some embodiments of the disclosed method, the preheat current includes a D-axis current and a Q-axis current.

In some embodiments of the disclosed method, the Q-axis current is equal to zero.

In some embodiments of the disclosed method, the D-axis current and the Q-axis current are converted to a three-phase supply current via an inverse direct-quadrature-zero transformation.

In some embodiments of the disclosed method, the D-axis current is determined based on a temperature of the motor.

In some embodiments of the disclosed method, the D-axis current is determined by closed-loop control based on the temperature of the motor.

In some embodiments of the disclosed method, the D-axis current is calculated by using a proportional-integral (PI) model of the closed-loop control.

In some embodiments of the disclosed method, the temperature of the motor is obtained based on a resistance of the motor and a temperature-resistance correlation of the motor.

In some embodiments of the disclosed method, the D-axis current is determined by open-loop control based on the temperature of the motor.

In some embodiments of the disclosed method, the D-axis current is selected to increase the temperature of the motor to a target temperature within a target preheat duration.

In some embodiments of the disclosed method, the method further includes controlling conversion of an input current provided by the power device into the preheat current.

In some embodiments of the disclosed method, the preheat current is less than or equal to a maximum current based on performance parameters of the power device.

In some embodiments of the disclosed method, the method further includes receiving a preheat request from a remote control device.

In some embodiments of the disclosed method, the method further includes:

determining whether to activate the preheat mode in response to the preheat request; and accepting the preheat request upon determining to activate the preheat mode; or rejecting the preheat request upon determining not to activate the preheat mode.

In some embodiments of the disclosed method, the method further includes notifying a remote control device of a preheat status of the power device.

In some embodiments of the disclosed method, the motor is configured to provide propulsion for a mobile platform.

In accordance with another aspect disclosed herein, there is set forth a system for controlling a motor energized by a power device, including:

a controller that operates to:

determine whether to activate a preheat mode based on a temperature of the power device; and upon determining to activate the preheat mode, control the power device to provide a preheat current to the motor, to enable simultaneous self-preheating of the motor and the power device.

In some embodiments of the disclosed system, the controller operates to:

determine to activate the preheat mode upon determining the temperature of the power device is less than a target temperature; and determine not to activate the preheat mode upon determining the temperature of the power device is greater than or equal to the target temperature.

In some embodiments of the disclosed system, the controller operates to obtain the temperature of the power device.

In some embodiments of the disclosed system, the temperature of the power device is obtained based on:

an environmental temperature;

a surface temperature of battery cells in the power device; or a combination thereof.

In some embodiments of the disclosed system, the controller operates to:

upon determining to activate the preheat mode, control the power device to supply a heating current to a heating element for heating the power device.

In some embodiments of the disclosed system, the heating element is located within the power device.

In some embodiments of the disclosed system, the heating element is located within a power device chamber accommodating the power device.

In some embodiments of the disclosed system, the controller enables the motor to generate an alert sound.

In some embodiments of the disclosed system, enabling the motor to generate the alert sound occurs simultaneously with the self-preheating.

In some embodiments of the disclosed system, the preheat current includes:

a Q-axis current for vibrating a rotor about a stator in the motor to generate the alert sound; and a D-axis current.

In some embodiments of the disclosed system, the Q-axis current and the D-axis current are converted to a three-phase supply current via an inverse direct-quadrature-zero transformation.

In some embodiments of the disclosed system, the Q-axis current is provided to the motor for a selected preheat duration based on the temperature of the motor.

In some embodiments of the disclosed system, an amplitude of the Q-axis current is selected to generate the alert sound at a target volume.

In some embodiments of the disclosed system, a frequency of the Q-axis current is selected to generate the alert sound at a target frequency.

In some embodiments of the disclosed system, the preheat current includes a D-axis current and a Q-axis current.

In some embodiments of the disclosed system, the Q-axis current is equal to zero.

In some embodiments of the disclosed system, the D-axis current and the Q-axis current are converted to a three-phase supply current via an inverse direct-quadrature-zero transformation.

In some embodiments of the disclosed system, the D-axis current is determined based on a temperature of the motor.

In some embodiments of the disclosed system, the D-axis current is determined by closed-loop control based on the temperature of the motor.

In some embodiments of the disclosed system, the D-axis current is calculated by using a proportional-integral (PI) model of the closed-loop control.

In some embodiments of the disclosed system, the temperature of the motor is obtained based on a resistance of the motor and a temperature-resistance correlation of the motor.

In some embodiments of the disclosed system, the D-axis current is determined by open-loop control based on the temperature of the motor.

In some embodiments of the disclosed system, the D-axis current is selected to increase the temperature of the motor to a target temperature within a target preheat duration.

In some embodiments of the disclosed system, the controller operates to control conversion of an input current provided by the power device into the preheat current.

In some embodiments of the disclosed system, the preheat current is less than or equal to a maximum current based on performance parameters of the power device.

In some embodiments of the disclosed system, the controller operates to receive a preheat request from a remote control device.

In some embodiments of the disclosed system, the controller operates to:

determine whether to activate the preheat mode in response to the preheat request; and accept the preheat request upon determining to activate the preheat mode; or reject the preheat request upon determining not to activate the preheat mode.

In some embodiments of the disclosed system, the controller operates to notify a remote control device of a preheat status of the power device.

In some embodiments of the disclosed system, the motor is configured to provide propulsion for a mobile platform.

In accordance with another aspect disclosed herein, there is set forth a mobile platform, including:

a motor configured to provide propulsion for the mobile platform;

a power device for energizing the motor; and a controller that operates to:

determine whether to activate a preheat mode based on a temperature of the power device; and upon determining to activate the preheat mode, control the power device to provide a preheat current to the motor, to enable simultaneous self-preheating of the motor and the power device.

In some embodiments of the disclosed mobile platform, the controller operates to:

determine to activate the preheat mode upon determining the temperature of the power device is less than a target temperature; and determine not to activate the preheat mode upon determining the temperature of the power device is greater than or equal to the target temperature.

In some embodiments of the disclosed mobile platform, the controller operates to obtain the temperature of the power device.

In some embodiments of the disclosed mobile platform, the temperature of the power device is obtained based on:
an environmental temperature;
a surface temperature of battery cells in the power device; or
a combination thereof.

In some embodiments of the disclosed mobile platform, the controller operates to:
upon determining to activate the preheat mode, control the power device to supply a heating current to a heating element for heating the power device.

In some embodiments of the disclosed mobile platform, the heating element is located within the power device.

In some embodiments of the disclosed mobile platform, the heating element is located within a power device chamber accommodating the power device.

In some embodiments of the disclosed mobile platform, the controller enables the motor to generate an alert sound.

In some embodiments of the disclosed mobile platform, enabling the motor to generate the alert sound occurs simultaneously with the self-preheating.

In some embodiments of the disclosed mobile platform, the preheat current includes:
a Q-axis current for vibrating a rotor about a stator in the motor to generate the alert sound; and
a D-axis current.

In some embodiments of the disclosed mobile platform, the Q-axis current and the D-axis current are converted to a three-phase supply current via an inverse direct-quadrature-zero transformation.

In some embodiments of the disclosed mobile platform, the Q-axis current is provided to the motor for a selected preheat duration based on the temperature of the motor.

In some embodiments of the disclosed mobile platform, an amplitude of the Q-axis current is selected to generate the alert sound at a target volume.

In some embodiments of the disclosed mobile platform, a frequency of the Q-axis current is selected to generate the alert sound at a target frequency.

In some embodiments of the disclosed mobile platform, the preheat current includes a D-axis current and a Q-axis current.

In some embodiments of the disclosed mobile platform, the Q-axis current is equal to zero.

In some embodiments of the disclosed mobile platform, the D-axis current and the Q-axis current are converted to a three-phase supply current via an inverse direct-quadrature-zero transformation.

In some embodiments of the disclosed mobile platform, the D-axis current is determined based on a temperature of the motor.

In some embodiments of the disclosed mobile platform, the D-axis current is determined by closed-loop control based on the temperature of the motor.

In some embodiments of the disclosed mobile platform, the D-axis current is calculated by using a proportional-integral (PI) model of the closed-loop control.

In some embodiments of the disclosed mobile platform, the temperature of the motor is obtained based on a resistance of the motor and a temperature-resistance correlation of the motor.

In some embodiments of the disclosed mobile platform, the D-axis current is determined by open-loop control based on the temperature of the motor.

In some embodiments of the disclosed mobile platform, the D-axis current is selected to increase the temperature of the motor to a target temperature within a target preheat duration.

In some embodiments of the disclosed mobile platform, the controller operates to control conversion of an input current provided by the power device into the preheat current.

In some embodiments of the disclosed mobile platform, the preheat current is less than or equal to a maximum current based on performance parameters of the power device.

In some embodiments of the disclosed mobile platform, the controller operates to receive a preheat request from a remote control device.

In some embodiments of the disclosed mobile platform, the controller operates to:
determine whether to activate the preheat mode in response to the preheat request; and
accept the preheat request upon determining to activate the preheat mode; or
reject the preheat request upon determining not to activate the preheat mode.

In some embodiments of the disclosed mobile platform, the controller operates to notify a remote control device of a preheat status of the power device.

In some embodiments of the disclosed mobile platform, the mobile platform includes an unmanned aerial vehicle (UAV).

In accordance with another aspect disclosed herein, there is set forth a computer-readable storage medium including machine-executable code that, upon execution by one or more processors, controls a motor.

Figure 1:
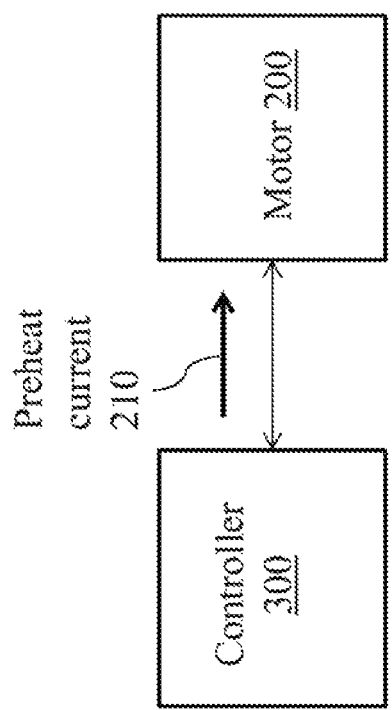
FIG. 1 is an exemplary top-level diagram illustrating an embodiment of a topology comprising a controller and a motor.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

Detailed Description of the Embodiments

Since currently-available methods and systems are incapable of ensuring high reliability in controlling a motor at a low temperature, a method and system that improve reliability in controlling a motor and preventing accidents or damage to the motor can prove desirable and provide a basis for a wide range of applications, such as a motor configured for use in cold weather and/or at high altitude. This result can be achieved, according to embodiments disclosed herein, by a topology 100 as illustrated in FIG. 1.

As shown in FIG. 1, the topology 100 can include a motor 200. The motor 200 can be configured for converting electrical energy into mechanical energy. An exemplary motor 200 can include a multi-phase brushless direct current (BLDC) motor, a single-phase brushless motor, a brushed motor, an alternating current (AC) induction motor, a permanent magnet synchronous motor, a stepper motor, a switched reluctance motor, or a combination thereof.

The motor 200, for example, can be coupled with a motion device (not shown). The motion device can include any structure that is mechanically driven by the motor 200 to generate a movement force. Exemplary movement device can include propellers, blades, wheels, axles, magnets, and/or nozzles.

The topology 100 of FIG. 1 also is shown as including a controller 300 for controlling one or more motor control signals for operating the motor 200. The motor control signals can be transmitted from the motor controller 300 to the motor 200. Stated somewhat differently, the motor 200 can receive the motor control signals from the motor controller 300. An exemplary motor control signal can include a preheat current 210. The controller 300 can directly provide the preheat current 210 to the motor 200. Additionally and/or alternatively, the controller 300 can control an intermediate system (not shown) to provide the preheat current 210 to the motor 200. The intermediate system, for example, can receive the preheat current 210 from the controller 300 and/or a power supply (not shown). The intermediate system can relay the preheat current 210 to the motor 200. The motor controller 300 thereby can provide the preheat current 210 to the motor 200 in an indirect manner.

The motor 200 can self-preheat by using the preheat current 210. Stated somewhat differently, by receiving the preheat current 210, the motor 200 can generate heat within the motor 200. With the preheat current 210, the motor 200 can be stationary and/or can generate a mechanical motion.

Additionally and/or alternatively, an exemplary motor control signal can include a drive current (not shown). The drive current can enable the motor 200 to generate a mechanical motion for operating and/or driving the motion device.

The topology 100 can advantageously improve safety of operating the motor 200. At a low temperature (for example, below 0° C.), electromagnetic parameters of the motor 200, such as resistance and/or impedance, can deviate significantly from optimal parameters. Such deviation can result in poor initial operation efficiency of the motor 200. Lubrication of bearings in the motor 200 can be low, which can increase friction and reduce lifetime of the motor 200. By using the topology 100, without adding additional hardware, the motor 200 can self-preheat to reach optimal operation condition prior to normal operation.

Figure 2:
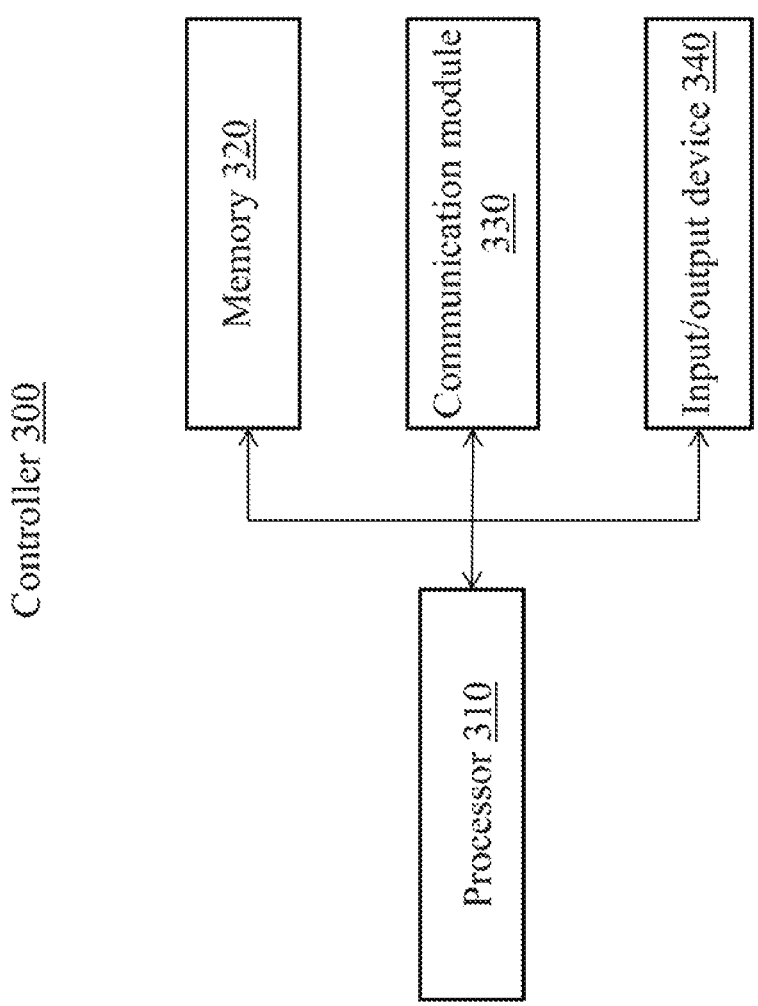
FIG. 2 is an exemplary diagram illustrating an embodiment of the controller of FIG. 1.

Turning to FIG. 2, an exemplary controller 300 is shown. FIG. 2 shows the controller 300 as including a processor 310. The processor 310 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The controller 300 can include one or more additional hardware components, as desired. Exemplary additional hardware components include, but are not limited to, a memory 320. The memory 320 can include any (non-transitory) computer-readable storage medium for storing machine-executable code. Exemplary memory 320 can include a random access memory (RAM), static RAM, dynamic RAM, read-only memory (ROM), programmable ROM, erasable programmable ROM, electrically erasable programmable ROM, flash memory, secure digital (SD) card, magnetic disk, optical disk, etc. Instructions for execution by the processor 310 can be stored on the memory 320.

The processor 310 and the memory 320 can be provided in an integrated and/or discrete manner.

Additionally and/or alternatively, the controller 300 can include a communication module 330. The communication module 330 can include any conventional hardware, interface, and/or software that operate to exchange data and/or instruction between the controller 300 and other control systems (not shown) in any wired and/or wireless communication manner. For example, the communication module 330 can include radio frequency (RF) circuitry (not shown) for receiving and/or transmitting RF signals, serial port, parallel port, and/or the like.

The controller 300 can include an input/output device 340. An exemplary input/output device 340 can include button, keyboard, keypad, trackball, display, touch screen, and/or monitor, as desired. An operator can input instructions to, and/or obtain information from, the controller 300 via the input/output device 340. The processor 310, the memory 320, the communication module 330, and/or the input/output device 340 can be configured to communicate, for example, using hardware connectors and buses and/or in a wireless manner.

Although FIG. 2 shows the controller 300 as including one processor 310, one memory 320, one communication module 330, and one input/output device 340 for purposes of illustration only, the controller 300 can include any uniform and/or different number of uniform and/or different processors 310, memories 320, communication modules 330 and/or input/output devices 340.

Figure 3:
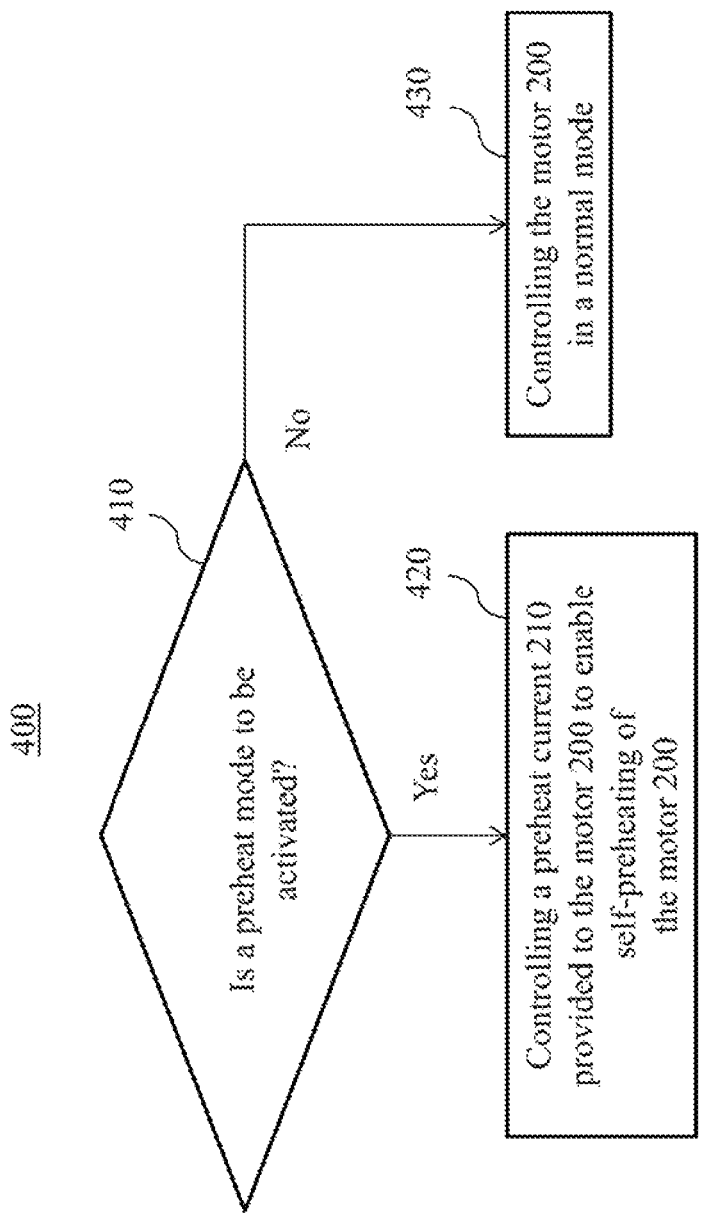
FIG. 3 is an exemplary top-level flow chart illustrating an embodiment of a method for controlling the motor of FIG. 1.

Turning to FIG. 3, an exemplary embodiment of a method 400 for controlling the motor 200 is shown. The method 400, for example, can be implemented in any suitable manner, including via the controller 300 (shown in FIG. 1). Whether to activate a preheat mode is determined, at 410. Whether to activate a preheat mode can be determined based on a temperature $T_M$ of the motor 200. The preheat mode can include a control mode in which the motor 200 can be preheated. The temperature $T_M$ can include an internal temperature of the motor 200.

For example, the temperature $T_M$ can be compared with a target temperature $T_N$. The target temperature $T_N$ can include any predetermined temperature value, without limitation. An exemplary target temperature $T_N$ can be a value selected from a temperature range from −10° C. to 10° C. For example, the target temperature $T_N$ can be 0° C.

In some embodiments, the target temperature $T_N$ can be stored on the controller 300 to be retrieved as needed. When the temperature $T_M$ is greater than or equal to the target temperature $T_N$, the motor 200 can operate safely and/or does not need preheating.

When the temperature $T_M$ is less than the target temperature $T_N$, the preheat mode can be activated. As shown in FIG. 3, the preheat current 210 provided to the motor 200 can be controlled, at 420, to enable self-preheating of the motor 200.

When the temperature $T_M$ is greater than or equal to the target temperature $T_N$, the preheat mode is not activated. The controller 300 does not provide the preheat current 210 for the motor 200 to self-preheat. In other words, the motor 200 does not receive the preheat current 210 for self-preheating. Optionally, the motor 200 can be controlled, at 430, in a normal mode. The normal mode can include a control mode in which the drive current is provided to the motor 200 to enable the motor 200 to generate a mechanical motion for operating and/or driving the motion device (not shown).

Figure 4:
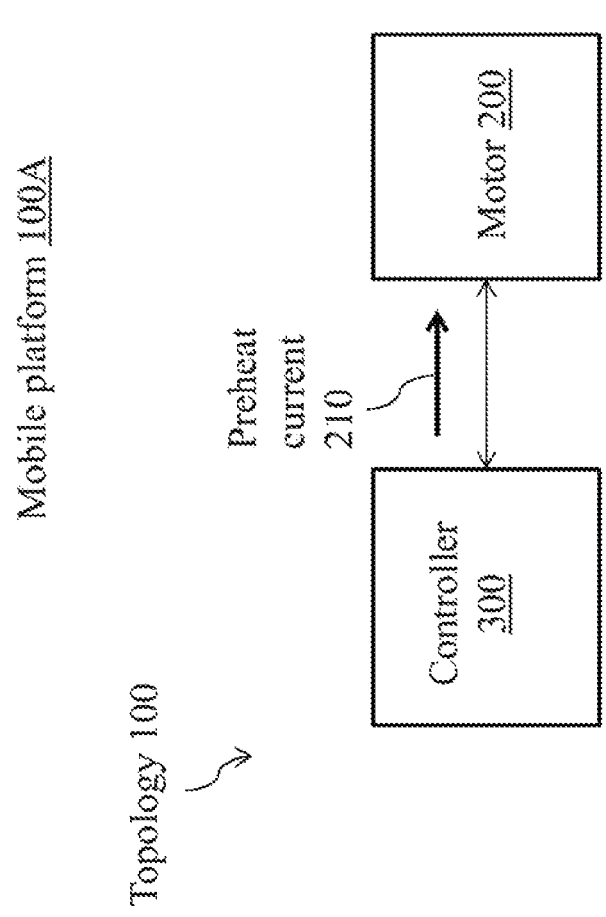
FIG. 4 is an exemplary diagram illustrating an embodiment of a mobile platform, wherein the topology of FIG. 1 can be at least partially located aboard the mobile platform.

Turning to FIG. 4, the topology 100 is shown as being at least partially located aboard a mobile platform 100A. Examples of the mobile platform 100A can include, but are not limited to, bicycles, automobiles, trucks, ships, boats, trains, helicopters, aircraft, various hybrids thereof, and the like. In some embodiments, the mobile platform 100A can be an unmanned aerial vehicle (UAV). Colloquially referred to as "drones," UAVs are aircraft without a human pilot (or operator) onboard the vehicle whose flight is controlled autonomously or by a remote pilot (or sometimes both). UAVs are now finding increased usage in applications involving various aerial operations, such as data-gathering and/or parcel delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

The motor 200 can provide a force for moving the mobile platform 100A. The movement force can include any type of force that can result in movement of the mobile platform 100A. Exemplary movement force can include propulsion, and/or thrust. For example, the motion device coupled with the motor 200 can include one or more propellers. In the normal mode (shown in FIG. 3), the motor 200 can drive the propellers to rotate. Such rotation can generate a thrust and/or propulsion for propelling or otherwise moving the mobile platform 100A.

Figure 5:
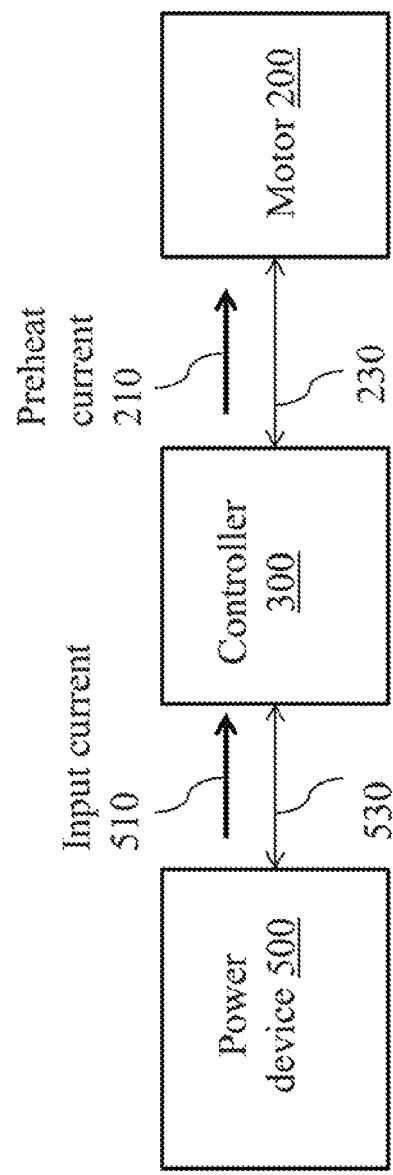
FIG. 5 is an exemplary diagram illustrating an alternative embodiment of the topology of FIG. 1, wherein the topology includes a power device.

Turning to FIG. 5, the topology 100 can include a power device 500 for energizing the motor 200. An exemplary power device 500 can include one or more batteries (not shown). The batteries can include rechargeable and/or non-rechargeable batteries. Exemplary types of batteries can include lead-acid batteries, lithium air batteries, lithium-ion batteries, nickel-cadmium batteries, nickel-metal hydrogen batteries.

As shown in FIG. 5, the controller 300 can draw an input current 510 from the power device 500 and provide the preheat current 210 to the motor 200. The motor controller 300 advantageously can transform the input current 510 into the preheat current 210. Optionally, the controller 300 can digitally encode the preheat current 210 using a suitable technique and supply the encoded preheat current 210 to the motor 200. Such encoding can advantageously enable the controller 300 to digitally control the preheat current. Exemplary techniques can include pulse-width modulation, pulse amplitude modulation, or a combination thereof.

FIG. 5 shows the topology 100 as including at least one connecting segment 530 for connecting the power device 500 with the controller 300, and/or at least one connecting segment 230 for connecting the motor 200 with the controller 300. Exemplary connecting segments 230, 530 can include a power cable for transporting the input current 510 and the preheat current 210, respectively.

Although the topology 100 is shown as including a single motor 200, a single controller 300, and a single power device 500 for purposes of illustration only, the topology 100 can include any suitable number of uniform and/or different motors 200, any suitable number of uniform and/or different controllers 300, and any suitable number of uniform and/or different power devices 500. A controller 300 can control one or more motors 200. One motor 200 can be controlled by one or more controllers 300. The controller 300 can draw the input current 510 from one or more uniform and/or different power devices 500. One or more motor controllers 300 can draw the input current 510 from one power device 500.

Figure 6:
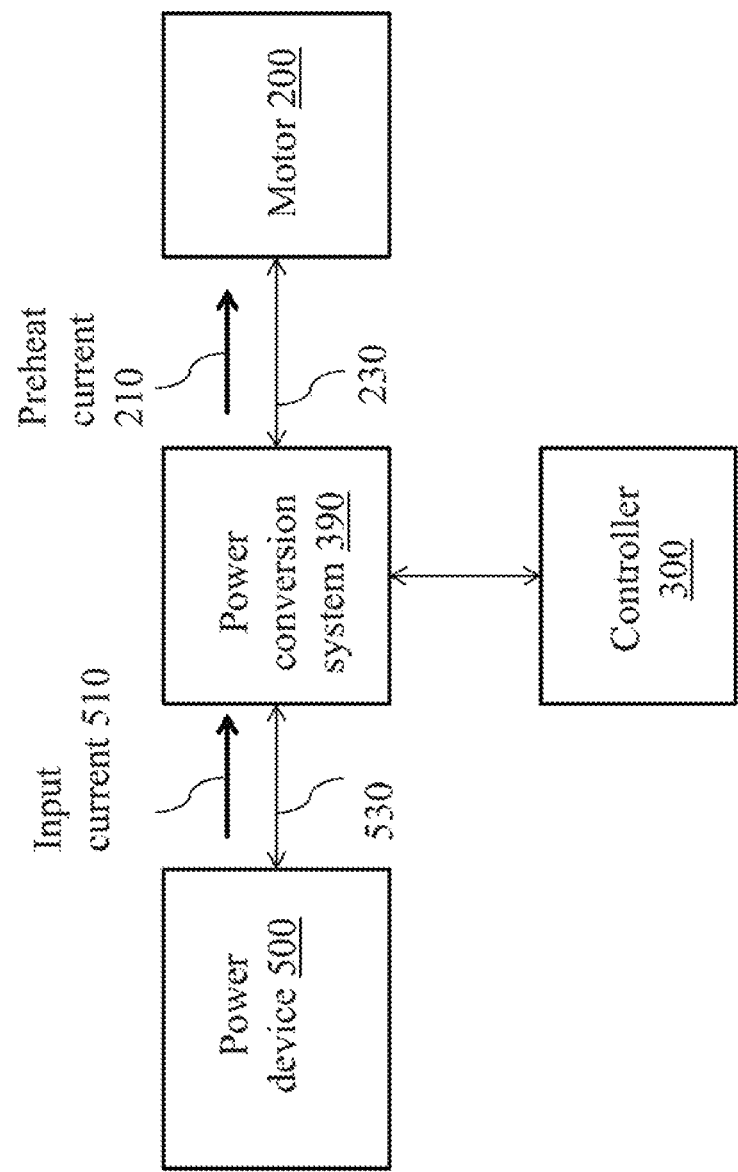
FIG. 6 is an exemplary diagram illustrating an alternative embodiment of the topology of FIG. 5, wherein the topology includes a power conversion system.

Turning to FIG. 6, the topology 100 is illustrated as including at least one power conversion system 390 in communication with the controller 300. The power conversion system 390 can convert the input current 510 into the preheat current 210 by being controlled by the controller 300. Stated somewhat differently, the controller 300 can control the power conversion system 390 to be an intermediate system for providing the preheat current 210 to the motor 200.

An exemplary power conversion system 390 can include a step-down transformer, a step-up transformer, a direct current (DC)-to-DC voltage converter, a power filter, a power frequency converter, a voltage rectifier, a power inverter, an alternating current (AC)-to-DC converter, a DC-to-AC converter, and/or a voltage regulator, without limitation. As desired, the power conversion system 390 can be at least partially integrated with the controller 300 and/or the power device 500.

The method 400 (shown in FIG. 3) and/or the topology 100 (shown in FIGS. 4-6) can advantageously improve safety of operating the motor 200. By using the method 400, without adding additional hardware, the motor 200 can self-preheat to reach optimal operation condition prior to providing propulsion to the mobile platform 100A (shown in FIG. 4). Operation efficiency and safety of the mobile platform 100A can thus be improved without increasing weight and/or hardware manufacturing cost of the mobile platform 100A.

Additionally and/or alternatively, the connecting segments 230, 530, the power device 500, and/or the controller 300 can simultaneously self-preheat by the input current 510 and/or the preheat current 210. Preparation of the mobile platform 100A for low temperature operation can thus be expedited.

At low temperature, the connecting segments 230, 530, and insulation thereof, can be brittle. For example, in the event of collision, the brittle connecting segments 230, 530 are likely to break. Preheating the connecting segments 230, 530 can prevent breaking and/or deformation of the connecting segments 230, 530, and/or prevent failure such as cable chafing.

At low temperature, discharge capacity of the power device 500 can decrease. A capability of the power device 500 for energizing the motor 200 can thus be significantly limited. For example, the mobile platform 100A can include a UAV 100B (not shown), so flight time for the UAV 100B can decrease. When the UAV 100B performs a large movement (such as a wide turn and/or a significant acceleration), the movement can be slow due to limited supply of current. In some cases, flight attitude of the UAV 100B can be out of control. To solve such a problem, the power device 500 can be preheated in a heater (not shown) prior to being installed aboard the mobile platform 100A. However, extra heater hardware is needed, and the power device 500 can cool down during installation aboard the mobile platform 100A. By using the method 400, the power device 500 advantageously can be preheated while being installed aboard the mobile platform 100A. The preheating thus can be more effective, and performance of the power device 500 can be improved.

The preheat current 210 can be less than or equal to a maximum current of the power device 500 based on performance parameters of the power device 500. For example, at low temperature, internal resistance of the power device 500 can decrease; so, supplying a large preheat current 210 can significantly reduce voltage across the power device 500. A battery management system (or BMU) (not shown) of the power device 500 can trigger a low-voltage protection and turn off the power device 500. To ensure supply of the preheat current 210, the controller 300 can be configured to record, and/or to obtain from the BMU, a maximum current for a selected temperature of the power device 500. When the power device 500 operates at the selected temperature, the controller 300 can supply the preheat current 210 that is no greater than the corresponding maximum current.

Exemplary performance parameters of the power device 500 for determining the maximum current can include a voltage threshold for triggering the low-voltage protection, an internal resistance at a selected temperature (and/or temperature range), capacity, temperature, state of charge (SOC), and/or depth of discharge (DOD) of the power device 500.

Figure 7:
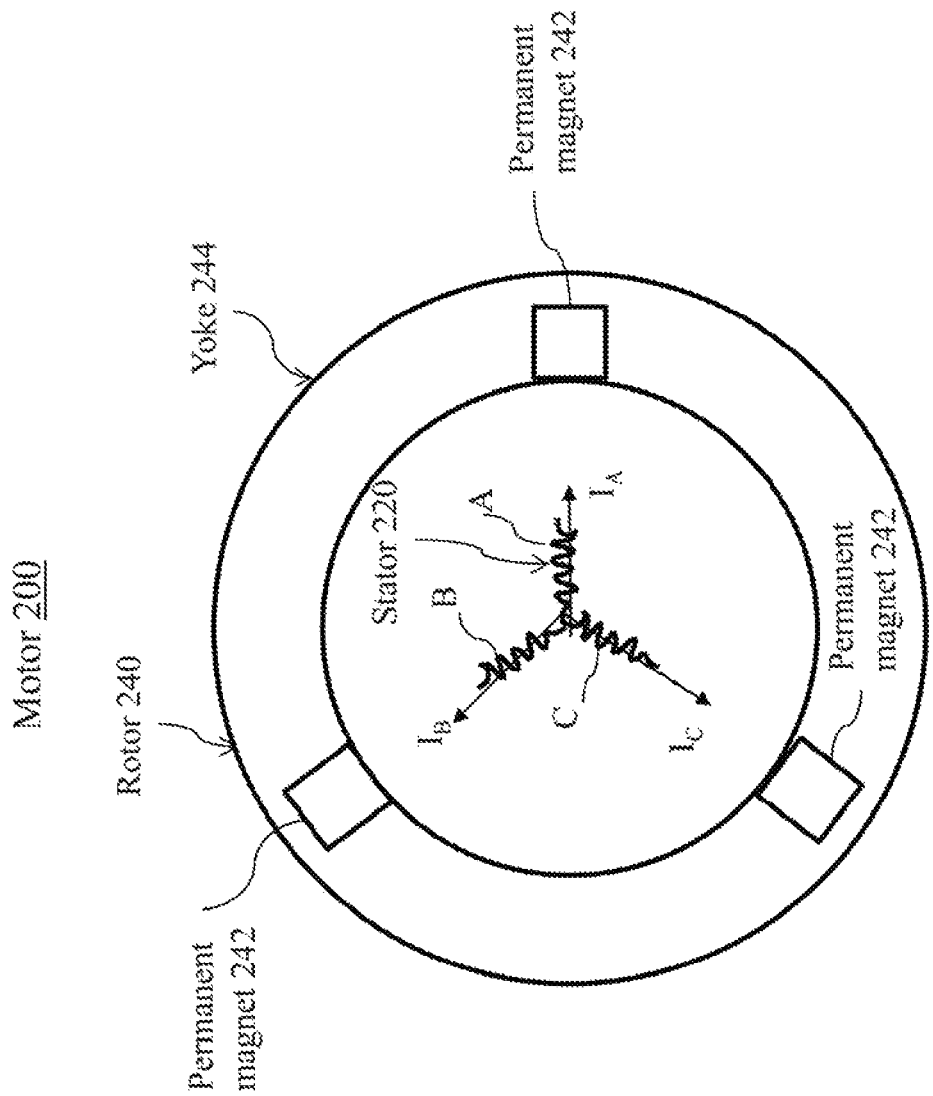
FIG. 7 is an exemplary diagram illustrating an embodiment of the motor of FIG. 1.
Figure 8:
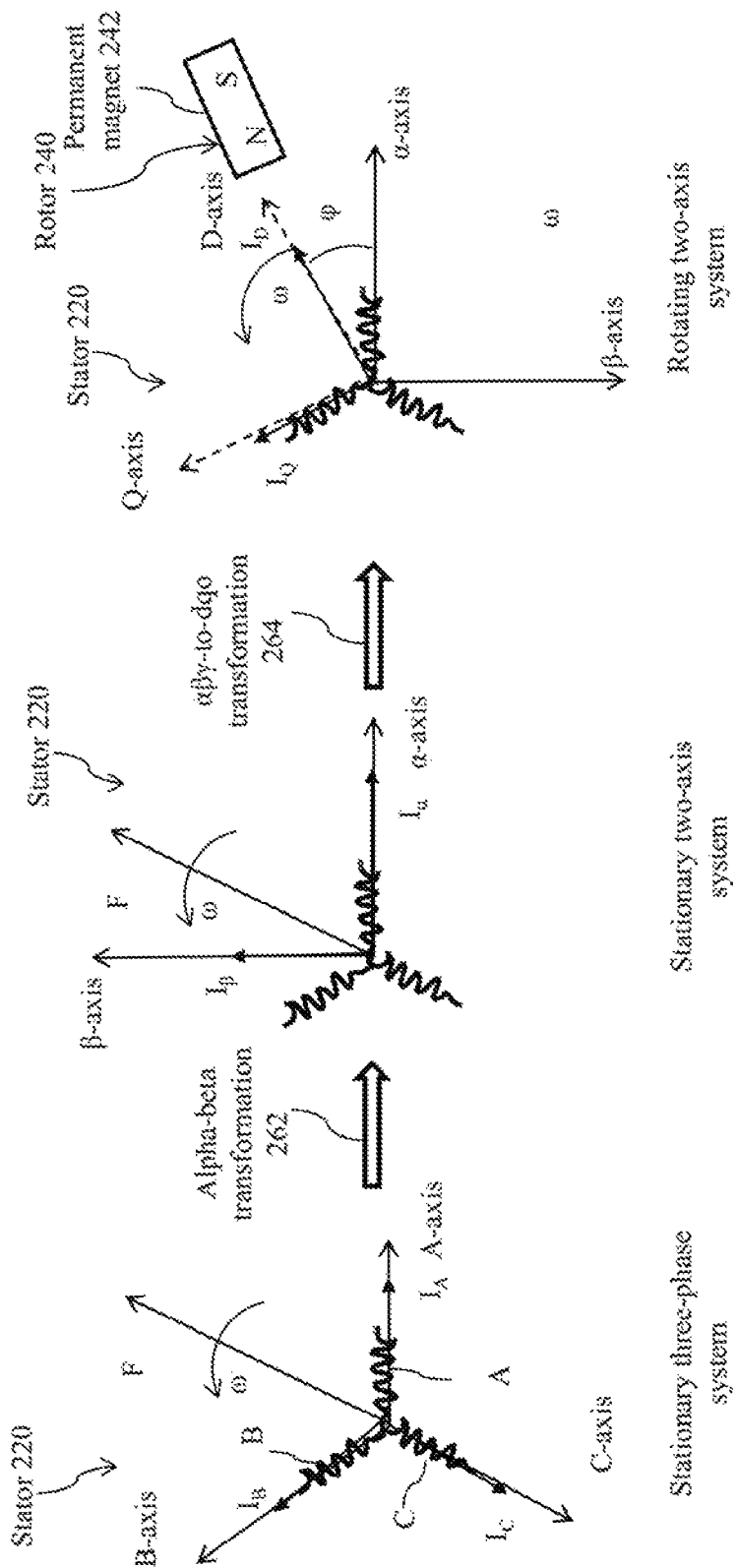
FIG. 8 is an exemplary diagram illustrating an embodiment of a direct-quadrature-zero (dqo) transformation of the motor of FIG. 7.

One exemplary application of the method 400 is illustrated with reference to FIGS. 7 and 8. FIG. 7 shows an alternative embodiment of the motor 200 as comprising a three-phase AC motor; whereas, FIG. 8 shows reference frames for analyzing the motor 200 of FIG. 7.

Turning to FIG. 7, the motor 200 is shown as including a stator 220 and a rotor 240 concentrically arranged about the stator 220. The stator 220 can include a predetermined number of coils A, B, C for a three-phase supply current. In other words, supply currents $I_A$, $I_B$, $I_C$ can pass through the coils A, B, C, respectively. The supply currents $I_A$, $I_B$, $I_C$ can include balanced AC currents, having a phase difference of 120 degrees therebetween. The coils A, B, C can be made of a conductive material, such as a metal and/or a metal alloy. The coils A, B, C can each generate respective magnetic fields (not shown) when the supply currents $I_A$, $I_B$, $I_C$ pass through the coils A, B, C. The magnetic fields can be controlled by controlling the supply currents $I_A$, $I_B$, $I_C$. Optionally, each of the coils A, B, C can be wound around one or more cores (not shown).

The rotor 240 of FIG. 7 is shown as including a predetermined number of permanent magnets 242 fixed on a yoke 244 arranged circumferentially about the stator 220. The predetermined number of permanent magnets 242 can be equal to and/or greater than the total number of the cores. The permanent magnets can move under torque produced by the magnetic field. As a result, the rotor 240 can rotate about the stator 220.

FIG. 7 shows the rotor 240 as being surrounding the stator 220 for illustrative purposes only. That is, the motor 200 can have the stator 220 arranged to be surrounding the rotor 240.

Turning to FIG. 8, a direct-quadrature-zero (dqo) transformation 260 for the motor 200 of FIG. 7 is shown. By changing reference frame, the dqo transformation 250 can mathematically transform the supply currents $I_A$, $I_B$, $I_C$ into a stationary three-phase system into a D-axis current and a Q-axis current in a rotating two-axis system. Thus, the dqo transformation 260 can simplify analysis of the motor 200.

As shown in FIG. 8, the dqo transformation 260 can include an alpha-beta transformation 262 (or αβγ transformation or Clarke transformation). The alpha-beta transformation 262 can transform the supply currents $I_A$, $I_B$, $I_C$ in the stationary three-phase system into an α-axis current $I_α$, and a β-axis current $I_β$ in a stationary two-axis system.

The stationary three-phase system can be defined by A-axis, B-axis, C-axis aligned with the coils A, B, C, respectively. Exemplary supply currents $I_A$, $I_B$, $I_C$ can be expressed via following equations:

$$I_A = |I|\cos(\omega t) \qquad \text{Equation (1-a)}$$

$$I_B = |I|\cos[\omega t - (2/3)\pi] \qquad \text{Equation (1-b)}$$

$$I_C = |I|\cos[\omega t + (2/3)\pi] \qquad \text{Equation (1-c)}$$

where t is time and is an amplitude of each of the supply currents $I_A$, $I_B$, $I_C$. The supply currents $I_A$, $I_B$, $I_C$ can exert a torque on the rotor 240 (shown in FIG. 7). The torque can enable the rotor 240 to rotate about the stator 220 with an angular velocity ω, indicated by a space vector F.

The stationary two-phase system can be defined by α-axis and β-axis. FIG. 8 shows the α-axis of an exemplary stationary two-phase system as being aligned with the A-axis. By using the alpha-beta transformation 262, the supply currents $I_A$, $I_B$, $I_C$ can be transformed into currents $I_α$, $I_β$ using the following equation:

$$I_{\alpha\beta} = \begin{bmatrix} I_\alpha \\ I_\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_A \\ I_B \\ I_C \end{bmatrix} \quad \text{Equation (2)}$$

As shown in FIG. 8, the dqo transformation 260 can include a αβγ-to-dqo transformation 264 (or Park transformation). The αβγ-to-dqo transformation 264 can transform the currents $I_α$, $I_β$ in the stationary two-axis system into a D-axis current $I_D$ and a Q-axis current $I_Q$ in a rotating two-axis system.

The rotating two-axis system can be defined by D-axis and Q-axis. FIG. 8 shows the D-axis and Q-axis as spinning at the angular velocity ω while being coaxial with α-axis and β-axis. Stated somewhat differently, the rotating two-axis system can represent exertion of the currents $I_α$, $I_β$ from a perspective of the rotor 240 that rotates at the angular velocity ω about the stator 220. By using the αβγ-to-dqo transformation 264, the currents $I_α$, $I_β$ can be transformed into a Q-axis current $I_Q$ and a D-axis current $I_D$ using the following equation:

$$\begin{bmatrix} I_D \\ I_Q \end{bmatrix} = \begin{bmatrix} \cos(\varphi) & \sin(\varphi) \\ -\sin(\varphi) & \cos(\varphi) \end{bmatrix} \begin{bmatrix} I_\alpha \\ I_\beta \end{bmatrix} \quad \text{Equation (3)}$$

where $\varphi = \omega t$.

FIG. 8 shows the permanent magnet 242 as being oriented in parallel with the D-axis and perpendicularly with respect to the Q-axis. That is, the Q-axis current $I_Q$ can generate a torque that drives the permanent magnet 242 to move circumferentially about the stator 220. In other words, by applying the Q-axis current $I_Q$ to the stator 220, electrical energy supplied via the Q-axis current $I_Q$ can at least partially be converted to mechanical energy. Stated somewhat differently, by applying the Q-axis current $I_Q$, electrical energy can be converted to mechanical energy, heat, or a combination thereof.

Applying the D-axis current $I_D$ on the stator 220 advantageously does not generate the torque to drive the permanent magnet 242 to rotate. Instead, the electrical energy of the D-axis current $I_D$ can be converted into heat.

Thus, given the supply currents $I_A$, $I_B$, $I_C$, the D-axis current $I_D$ and the Q-axis current $I_Q$ can be determined via the dqo transformation 260. On the other hand, given a D-axis current $I_D$ and a Q-axis current $I_Q$, the supply currents $I_A$, $I_B$, $I_C$ can be determined by applying an inverse dqo transformation to the currents $I_D$, $I_Q$. The inverse dqo transformation can be an inverse transformation of the dqo transformation 260. For example, applying the inverse dqo transformation can include sequentially applying an inverse αβγ-to-dqo transformation 264 and an inverse alpha-beta transformation 262 to the currents $I_D$, $I_Q$. An exemplary inverse αβγ-to-dqo transformation can include an inverse of the αβγ-to-dqo transformation in Equation (3). An exemplary inverse alpha-beta transformation can include an inverse of the alpha-beta transformation in Equation (2).

To implement the method 400 (shown in FIG. 3), the controller 300 (shown in FIG. 1) can perform the dqo transformation 260 and/or the inverse dqo transformation when the D-axis current $I_D$ and the Q-axis current $I_Q$ are used.

For example, the controller 300 can obtain the temperature $T_M$ of the motor 200. For example, the temperature $T_M$ can include a temperature of one or more selected electrical components of the motor 200 for receiving current from the controller 300. An exemplary temperature $T_M$ of the motor 200 can include a coil temperature $T_C$ of the coils A, B, C (shown in FIG. 7). In one example, the controller 300 can obtain the temperature $T_M$ of the motor 200 based on any temperature sensing technique, such as a temperature sensor (not shown) of the controller 300 and/or of the motor 200.

In another example, the D-axis current $I_D$ can be used for obtaining the temperature $T_M$ of the motor 200. The coil temperature $T_C$ can be obtained at least partially based on an internal resistance $R_S$ (not shown) of the motor 200 and a temperature-resistance correlation of the motor 200. An exemplary internal resistance $R_S$ can include a resistance of the coils A, B, C.

For example, the controller 300 can apply a selected current to the motor 200 and measure actual supply currents $I_A$, $I_B$, $I_C$ through the motor 200 and corresponding supply voltages. The currents $I_A$, $I_B$, $I_C$ can be transformed to the D-axis current $I_D$. The supply voltages can be transformed to a D-axis voltage VD. Using the D-axis current $I_D$ and the D-axis voltage VD, the internal resistance $R_S$ of the motor 200 can be obtained via Ohm's law.

An exemplary temperature-resistance correlation of the motor 200 can be as follows:

$$R_S = R_0[1 + \alpha_T(T_M - T_0)] \quad \text{Equation (4)}$$

where $R_0$ is an internal resistance of the motor 200 at a reference temperature $T_0$, $\alpha_T$ is a temperature coefficient of the motor 200. Value of the temperature coefficient $\alpha_T$ can depend on a composition of the motor 200. An exemplary composition of the motor 200 can include a composition of each of the coils A, B, C. In one example, the coils A, B, C can be formed from copper, the value of the temperature coefficient $\alpha_T$ can thus be 0.00393/° C., which is the temperature coefficient $\alpha_T$ of copper.

Optionally, to improve accuracy of the measured internal resistance $R_S$, the D-axis current $I_D$ can be small. A small D-axis current $I_D$ can avoid greatly heating up the motor 200 and/or significantly changing the temperature $T_M$ of the motor 200 within a duration of the measurement. Accuracy of the measurement can thus be improved.

Additionally and/or alternatively, the motor 200 can include a temperature sensor (not shown) for measuring the temperature $T_M$. In some cases, a measurement based on the internal resistance $R_S$ may advantageously be more accurate than a measurement based on a temperature sensor within the motor 200. For example, the electromagnetic field within the motor 200 may interfere with operation of the temperature sensor. The temperature sensor can be shielded within an electromagnetic screening structure to prevent the interference. However, the temperature sensor can thus sense temperature of electromagnetic screening structure rather than the temperature $T_M$ of the motor 200, so accuracy of the measurement can be affected.

Therefore, additionally and/or alternatively, the temperature $T_M$ can be obtained at least partially based on a temperature sensor located distally from the motor 200. An exemplary temperature sensor can include a temperature sensor located outside the motor 200.

Figure 9:
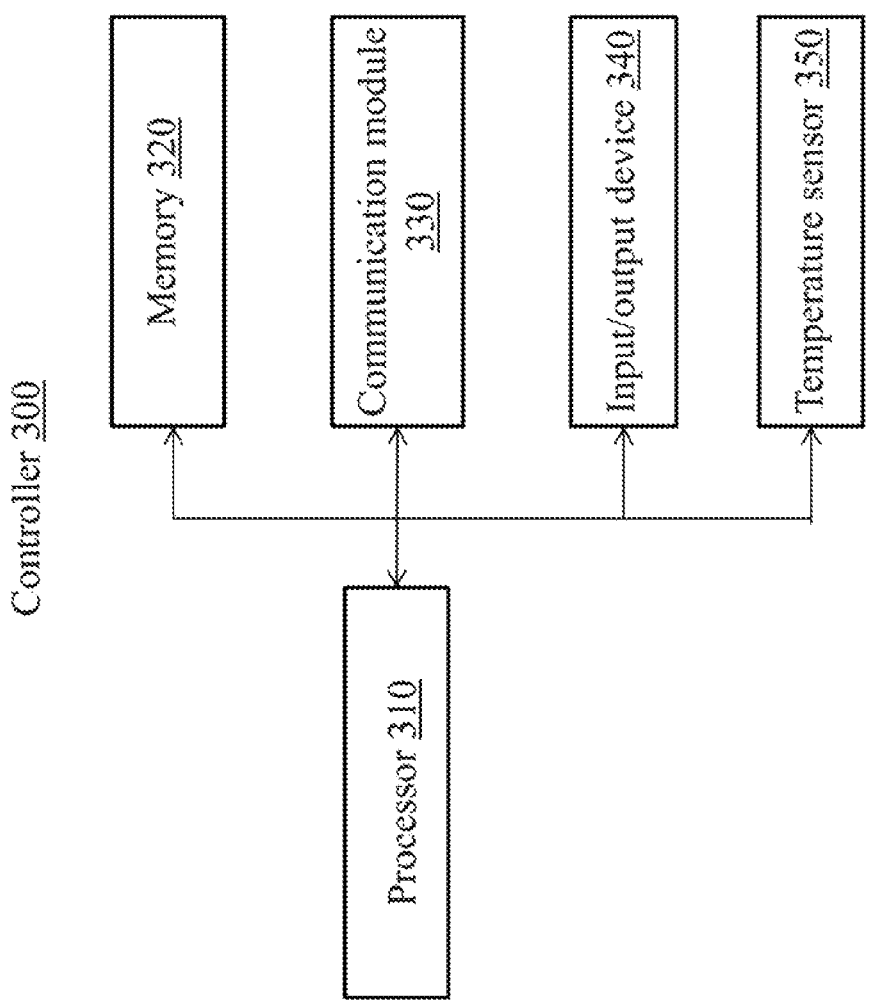
FIG. 9 is an exemplary diagram illustrating an alternative embodiment of the controller of FIG. 2, wherein the controller comprises a temperature sensor.

Turning to FIG. 9, the controller 300 is shown to include a temperature sensor 350 in communication with the processor 310. An exemplary temperature sensor can include a diode device.

The temperature sensor 350 can obtain an environmental temperature $T_E$. The environmental temperature $T_E$ can indicate an external temperature outside of the motor 200 (shown in FIG. 1). Prior to preheating of the motor 200, the environmental temperature of $T_E$ can be consistent with, and/or equal to, the temperature $T_M$ of the motor 200. In other words, the environmental temperature of $T_E$ can provide a suitable approximation of the temperature $T_M$ of the motor 200.

Figure 10:
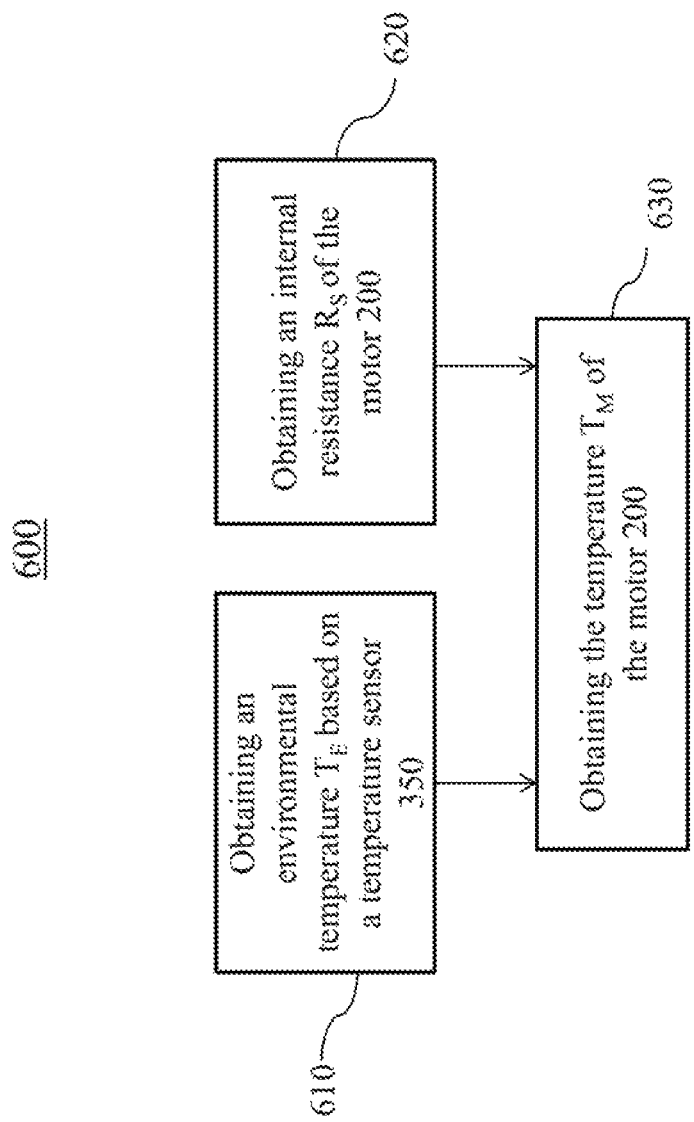
FIG. 10 is an exemplary diagram illustrating an embodiment of a method for obtaining a temperature of the motor of FIG. 1.

Turning to FIG. 10, an embodiment of an exemplary method 600 for obtaining the temperature $T_M$ of the motor 200 is shown. For example, the method 600 can be used by the controller 300 for measuring the temperature $T_M$. The environmental temperature $T_E$ of the motor 200 is obtained, at 610, based on the temperature sensor 350. The internal resistance $R_S$ of the motor 200 is obtained, at 620.

The temperature $T_M$ of the motor 200 is obtained, at 630. The temperature $T_M$ can be obtained by combining the environmental temperature $T_E$ and the coil temperature $T_C$ that is calculated based on the internal resistance $R_S$. For example, the temperature $T_M$ can be based on a weighted and/or unweighted average of the environmental temperature $T_E$ and the coil temperature $T_C$.

Respective weights associated with the environmental temperature $T_E$ and the coil temperature $T_C$ can be predetermined based on respective accuracies of measuring the environmental temperature $T_E$ and the coil temperature $T_C$. For example, the accuracy of measuring the environmental temperature $T_E$ can be based on accuracy of the temperature sensor 350. The accuracy of measuring the environmental temperature $T_E$ can be based on accuracy of measuring internal resistance $R_S$ and/or the temperature-resistance correlation.

An advantage of using multiple sensors and/or measurements for obtaining the temperature $T_M$ is that measurements can be rendered more accurate by redundancy, and the measurements can be more robust to limitations of particular sensors and/or measurements. For example, the coil temperature $T_C$ based on the internal resistance $R_S$ may be associated with certain errors because, in some cases, the temperature coefficient $\alpha_T$ used in Equation (4) can be an approximate value that does not necessarily correspond to precise composition of the coils A, B, C (shown in FIG. 7).

Although FIG. 10 shows the environmental temperature $T_E$ as being obtained based on the temperature sensor 350 for illustrative purposes, the environmental temperature $T_E$ can be obtained based on combining measurements of any predetermined number of other uniform and/or different temperature sensors located distally from the motor 200.

The preheat current 210 (shown in FIG. 1) can be determined based on the temperature $T_M$. Exemplary preheat current 210 can include a D-axis current $I_D$. In one embodiment, the Q-axis current $I_Q$ can be equal to zero. Advantageously, the motor 200 (shown in FIG. 1) can be stationary with all electrical energy being converted to heat.

Figure 11:
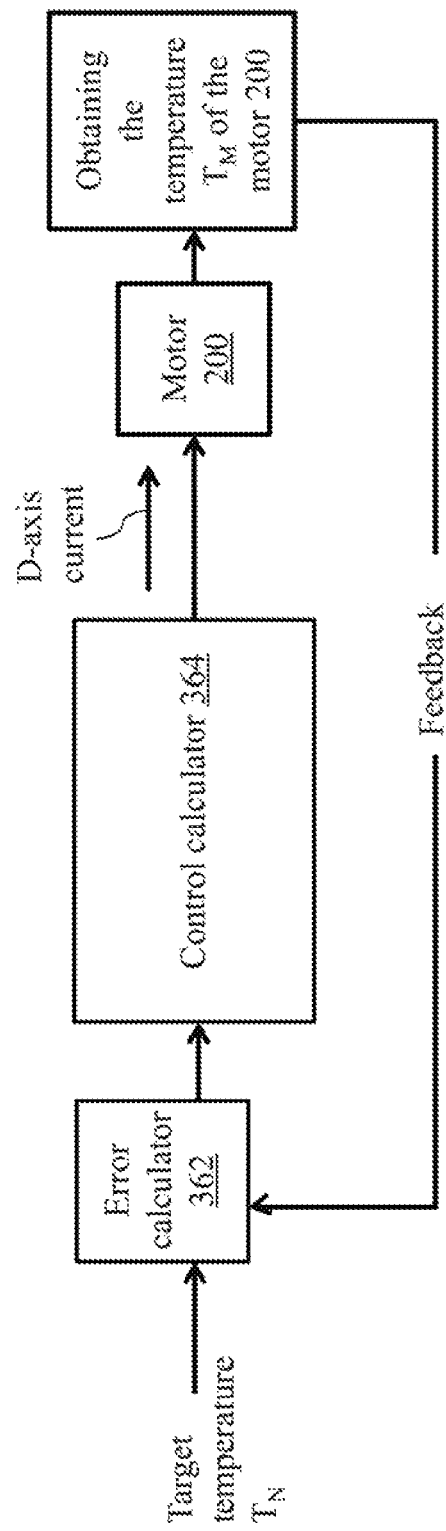
FIG. 11 is an exemplary diagram illustrating an embodiment of a closed-loop control topology for controlling the motor of FIG. 1.

The D-axis current $I_D$ can be determined in any suitable manner. FIG. 11 shows an exemplary embodiment of a closed-loop control topology 360 for determining the D-axis current $I_D$ based on the obtained temperature $T_M$. The temperature $T_M$ and the target temperature $T_N$ are provided to an error calculator 362 to determine an error (or deviation) of the temperature $T_M$ relative to the target temperature $T_N$. A control calculator 364 can calculate the D-axis current $I_D$ based on the error. The error calculator 362 and/or the control calculator 364 can be implemented in any suitable manner, including via the controller 300 (shown in FIG. 1).

The D-axis current $I_D$ calculated by the control calculator 364 can be supplied to the motor 200 for a selected time duration. The temperature $T_M$ of the heated motor 200 can be obtained and fed back to the error calculator 362. The closed-loop control can be repeatedly performed. When the error calculator 362 determines that no error is present, preheating can be completed. The error calculator 362 can determine that no error is present based on a determination that the temperature $T_M$ is greater than or equal to the target temperature $T_N$.

Figure 12:
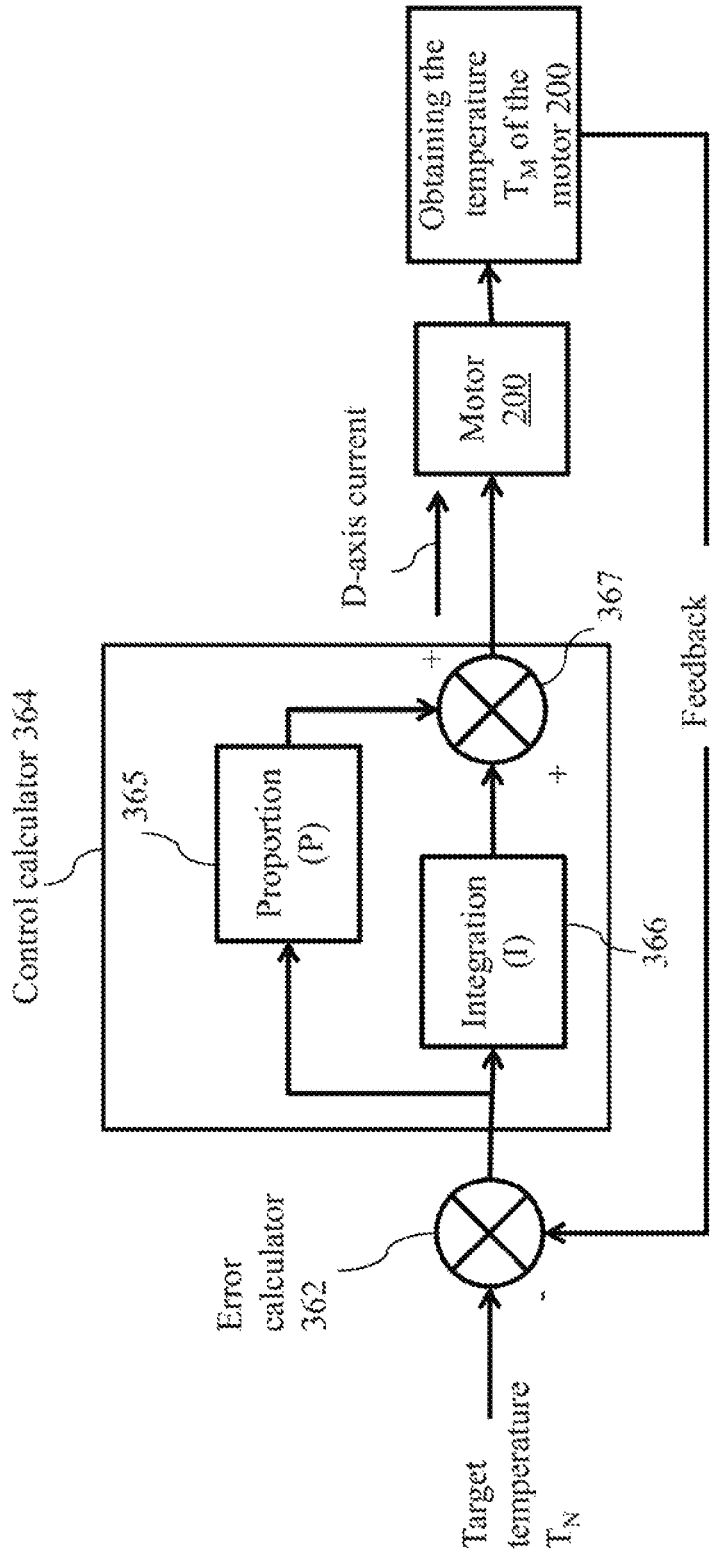
FIG. 12 is an exemplary diagram illustrating an alternative embodiment of the closed-loop control topology of FIG. 11, wherein the closed-loop control topology is based on a proportional-integral (PI) model.

FIG. 12 shows an alternative embodiment of the closed-loop control topology 360 as determining the D-axis current $I_D$ using a proportional-integral (PI) model. The error calculator 362 can determine an error based on a difference between the temperature $T_M$ and the target temperature $T_N$:

$$\text{error} = T_M - T_N. \quad \text{Equation (5)}$$

The control calculator 364 can include a proportional calculator 365 and an integral calculator 366 for respectively calculating a proportion term P and an integration term I:

$$P = K_P * \text{error}_n, \quad \text{Equation (6)}$$

$$I = K_i * \Sigma_{i=0}^{n} \text{error}_n \quad \text{Equation (7)}$$

where $\text{error}_n$ is the error measured at the $n_{th}$ time, $K_P$ is a proportional gain, and $K_i$ is an integral gain. The D-axis current $I_D$ can be calculated by adding the proportion term P to the integration term I, via an operator 367 shown in FIG. 12:

$$I_d = P + I = K_P * \text{error}_n + K_i * \Sigma_{i=0}^{n} \text{error}_n. \quad \text{Equation (8)}$$

The proportional gain $K_P$ and/or the integral gain $K_i$ can be tuned in any manner for the closed-loop control topology 360 to achieve a selected speed of preheating. For example, the proportional gain $K_P$ and/or the integral gain $K_i$ can be determined based on tuning via a tuning process (shown in FIG. 13 and FIG. 14).

Although FIG. 12 shows the closed-loop control topology 360 as using the (PI) model for illustrative purposes only, the closed-loop control topology 360 can use any other control model, without limitation. Exemplary control models can include proportional (P) model, integral (I) model, proportional-differential (PD) model, proportional-integral-differential (PID) model, or a combination thereof.

Figure 13:
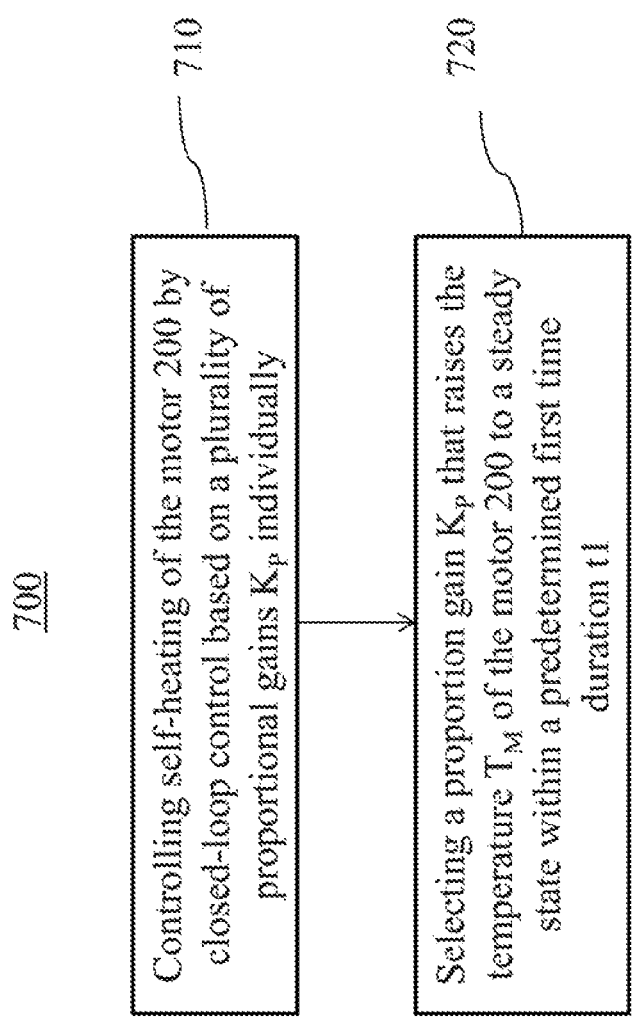
FIG. 13 is an exemplary diagram illustrating an embodiment of a method for obtaining a proportional gain of the PI model of FIG. 12.

FIG. 13 shows an exemplary method 700 for determining the proportional gain $K_P$. The motor 200 is preheated, at 710, by the closed-loop control individually (and/or respectively) based on a plurality of proportional gains $K_P$. In one embodiment, the motor 200 can be self-preheated using the D-axis current $I_D$ by the closed-loop control based on a selected proportional gain $K_P$. The self-preheating of the motor 200 can be repeated, each time based on a different proportional gain $K_P$. Optionally, the closed-loop control in the tuning process can be based on a selected integral gain $K_i$. For example, the integral gain $K_i$ can be zero.

A proportional gain $K_P$ can be selected, at 720, upon a determination that the proportional gain $K_P$ raises the temperature $T_M$ of the motor to a steady state within a predetermined first time duration t1. In a case that more than one proportional gain $K_P$ can raise the temperature $T_M$ of the motor to the steady state within the first time duration t1, one proportional gain $K_P$ of the plurality of proportional gains $K_P$ can be selected. In one embodiment, a smallest proportional gain $K_P$ of the plurality of proportional gains $K_P$ can be selected. By selecting the smallest proportional gain $K_P$, the self-preheating can advantageously consume less electrical power.

Figure 14:
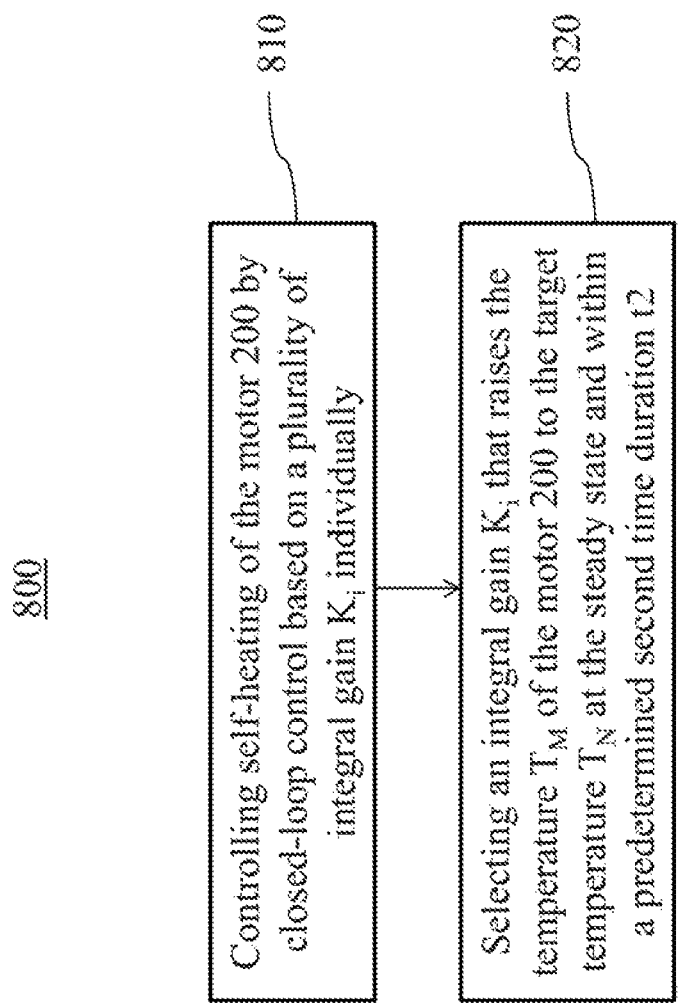
FIG. 14 is an exemplary diagram illustrating an embodiment of a method for obtaining an integral gain of the PI model of FIG. 12.

The temperature $T_M$ at the steady state is not necessarily equal to the target temperature $T_N$ when the D-axis current $I_D$ is calculated based on the proportion term P. The integration term I can advantageously reduce error of the temperature $T_M$ at the steady state. FIG. 14 shows an exemplary method 800 for determining the integral gain $K_i$. The motor 200 is preheated, at 810, by the closed-loop control individually (and/or respectively) based on a plurality of integral gains $K_i$. In one embodiment, the motor 200 can be self-preheated using the D-axis current $I_D$ by the closed-loop control selected based at least in part on an integral gain $K_i$. The self-preheating of the motor 200 can be repeated, each time based on a different integral gain $K_i$. Optionally, the proportional gain $K_p$ can be the proportional gains $K_p$ selected based on the method 700 (shown in FIG. 13).

An integral gain $K_i$ can be selected, at 820, upon a determination that the integral gain $K_i$ raises the temperature $T_M$ of the motor 200 to the target temperature $T_N$ at the steady state. Additionally and/or alternatively, the integral gain $K_i$ that is selected can raise the temperature $T_M$ of the motor 200 to the target temperature $T_N$ within a predetermined second time duration t2. In a case that more than one integral gain $K_i$ can raise the temperature $T_M$ in such a manner, one integral gain $K_i$ of the plurality of integral gains $K_i$ can be selected. In one embodiment, a smallest integral gain $K_i$ of the plurality of integral gains $K_i$ can be selected. By selecting the smallest integral gain $K_i$, the self-preheating can advantageously consume less electrical power.

A plurality of combinations of the proportional gains $K_p$ and the integral gains $K_i$ can be recorded via the controller 300 (shown in FIG. 1), in association with corresponding temperature increase rate. The controller 300 thereby can select a combination at least partially based on a target preheat duration. The target preheat duration can include a length of time that the preheating can be performed. An exemplary target preheat duration can be a built-in parameter stored in the controller 300 and/or a customizable parameter inputted into the controller 300.

Additionally and/or alternatively, the D-axis current $I_D$ can be determined by open-loop control. For example, based on the temperature $T_M$ and the target temperature $T_N$, the controller 300 can select a D-axis current $I_D$ that can increase the temperature $T_M$ to the target temperature $T_N$ within the target preheat duration. In one embodiment, via a tuning process, temperature increase achieved by a plurality of D-axis currents $I_D$ can be respectively monitored, results of which can be stored in the controller 300. The controller 300 can select the D-axis current $I_D$ based on the target preheat duration and/or the required temperature increase.

Figure 15:
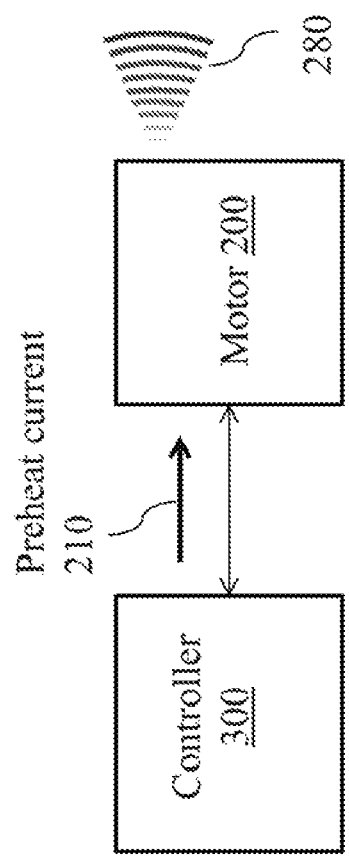
FIG. 15 is an exemplary diagram illustrating an alternative embodiment of the topology of FIG. 1, wherein the motor can be configured to generate an alert sound.

Turning to FIG. 15, the motor 200 is shown as being configured to generate an alert sound 280. In one embodiment, the preheat current 210 can enable the motor 200 to generate the alert sound 280. An exemplary alert sound 280 can comprise any audible sound, such as beeping, music, voice, and/or a combination thereof.

The preheat current 210 can sequentially and/or simultaneously preheat the motor 200 and generate the alert sound 280. For example, the preheat current 210 can simultaneously preheat the motor 200 and generate the alert sound 280. Advantageously, the alert sound 280 can inform an operator that the motor 200 is being preheated. User experience can thus be improved.

Figure 16:
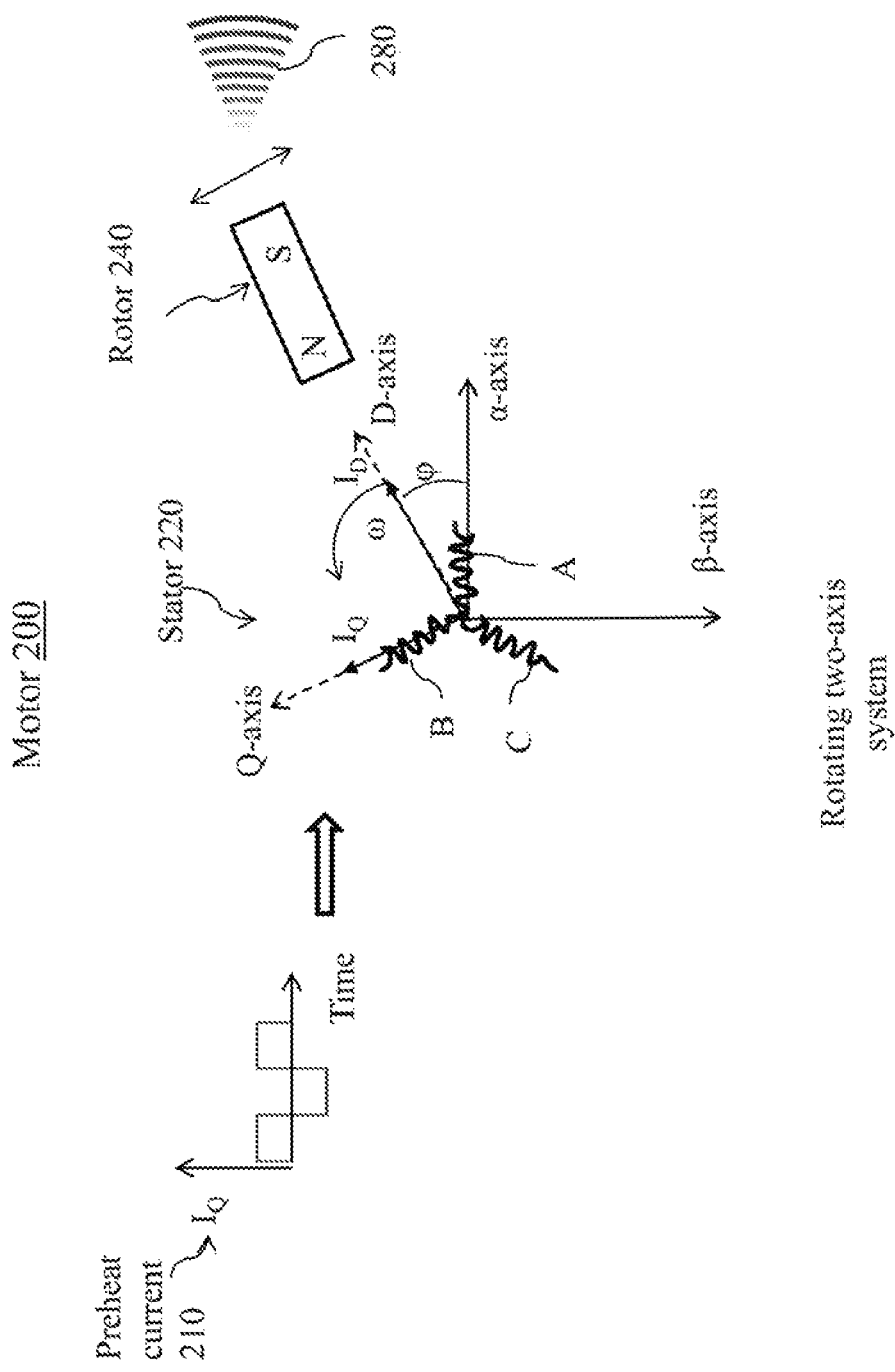
FIG. 16 is an exemplary diagram illustrating an embodiment of the motor of FIG. 15, wherein a Q-axis current is supplied to the motor.

Turning to FIG. 16, the motor 200 is illustrated with reference to a rotating two-axis system. The preheat current 210 can include a Q-axis current $I_Q$ for vibrating the rotor 240 about the stator 220. FIG. 16 shows the Q-axis current $I_Q$ as having an oscillating square waveform with a predetermined frequency. Torque exerted on the rotor 240 by the Q-axis current $I_Q$ can thus oscillate between at least two opposite directions, resulting in vibration of the rotor 240 in response. Such vibration can produce sound waves to generate the alert sound 280. When the frequency of the oscillation ranges from 20 Hz to 20 kHz, the alert sound 280 can be audible to humans.

A frequency of the Q-axis current $I_Q$ can be selected to generate the alert sound 280 at a target frequency. An amplitude of the Q-axis current $I_Q$ can be selected to generate the alert sound 280 at a target volume. For example, increasing the amplitude of the Q-axis current $I_Q$ can increase a volume of the alert sound 280. In one embodiment, tuning of the frequency and/or the amplitude of the Q-axis current $I_Q$ can be performed to achieve a desired effect of the alert sound 280.

In one embodiment, temperature increase achieved by a plurality of Q-axis current $I_Q$ can be respectively monitored, results of which can be stored in the controller 300 (shown in FIG. 15). The controller 300 can select and/or supply the Q-axis current $I_Q$ in any suitable manner. For example, to preheat the motor 200, the controller 300 can select the Q-axis current $I_Q$ based on the target preheat duration and/or the temperature increase to be achieved. The Q-axis current can thus be supplied to preheat the motor 200 for the target preheat duration.

In another embodiment, the preheat current 210 can include both the Q-axis current $I_Q$ and the D-axis current $I_D$. For example, when the Q-axis current $I_Q$ is insufficient for achieving a required temperature increase within the target preheat duration, the controller 300 can apply the D-axis current $I_D$ for the motor 200 to self-preheat more efficiently. In another example, the controller 300 can apply the D-axis current $I_D$ and/or the Q-axis current continuously and/or intermittently during the preheating.

Although FIG. 16 shows the Q-axis current $I_Q$ as being in a square wave form, the Q-axis current $I_Q$ can comprise one or more other oscillating waveforms, including any other uniform and/or different oscillating waveforms. Each of the waveforms can be periodic and/or otherwise time-varying. For example, the Q-axis current $I_Q$ can have a sound waveform. An exemplary sound waveform can be generated based on decoding an audio media file. Content of the media file can thus be audibly reproduced by the motor 200.

Figure 17:
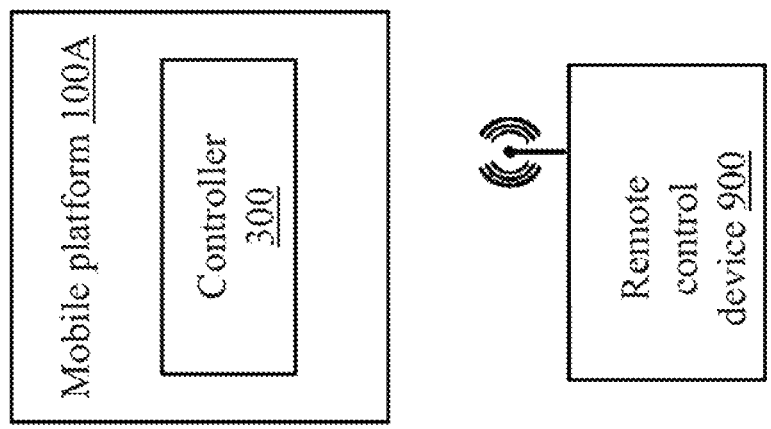
FIG. 17 is an exemplary diagram illustrating another alternative embodiment of the mobile platform of FIG. 4, wherein the mobile platform can communicate with a remote control device.

Turning to FIG. 17, the mobile platform 100A is shown to be in communication with a remote control device 900. The remote control device 900 can be located distally from the mobile platform 100A.

For example, the remote control device 900 can send instructions to the controller 300 and/or receive information from the controller 300 in a wired and/or wireless manner. Optionally, the remote control device 900 can receive input from an operator for controlling the mobile platform 100A remotely.

Figure 18:
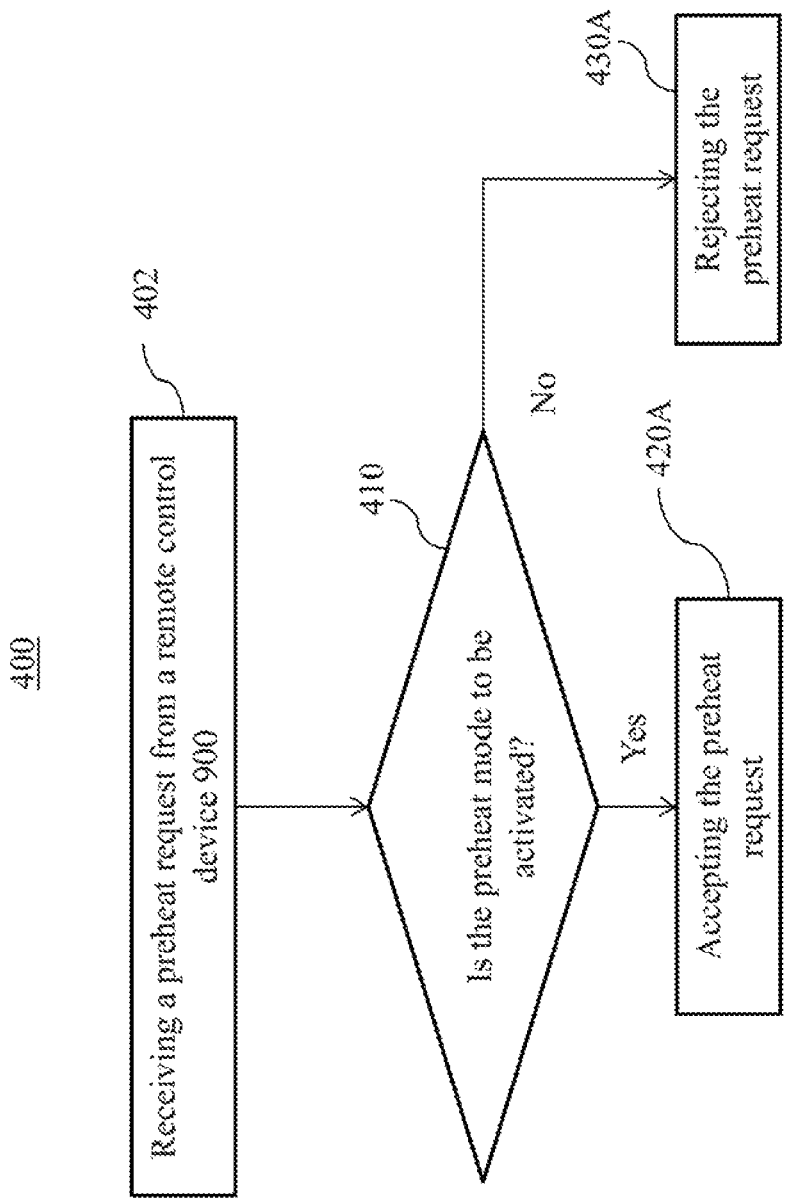
FIG. 18 is an exemplary flow chart illustrating an alternative embodiment of the method of FIG. 3, wherein the controller can determine whether to preheat the motor in response to a preheat request from the remote control device of FIG. 17.

Turning to FIG. 18, an alternative embodiment of the method 400 is shown. As shown in FIG. 18, a preheat request can be received, at 402, from the remote control device 900. For example, the controller 300 (shown in FIG.

17) can receive the preheat request from the remote control device 900. The preheat request can request preheating of the mobile platform 100A (shown in FIG. 17) and/or one or more selected components of the mobile platform 100A, such as, for example, the motor 200.

When the controller 300 determines to activate the preheat mode, the controller 300 can accept, at 420A, the preheat request. Upon accepting the preheat request, the controller 300 can control the preheat current 210 (shown in FIG. 1) for the motor 200 to self-preheat. When the controller 300 determines not to activate the preheat mode, the controller 900 can reject, at 430A, the preheat request. For example, the controller 300 can send an optional notification to the remote control device 900 indicating that the motor 200 does not need preheating and/or that the preheat request is not accepted. Thus, the controller 300 can respond to an operator regarding whether to preheat the motor 200. Advantageously, user experience can be improved.

Additionally and/or alternatively, the controller 300 can notify the remote control device 900 of a preheat status of the mobile platform 100A and/or one or more selected components of the mobile platform 100A, such as the motor 200 and/or the power device 500 (shown in FIGS. 5 and 6). The remote control device 900 can indicate the preheat status to the operator. Exemplary preheat status can include a prompt indicating that the motor 200 needs preheating, the temperature $T_M$ of the motor 200 prior to and/or during the preheating, the target time duration for preheating, elapsed time of preheating, remaining time of preheating, completion of preheating, and/or a combination thereof. Via the preheating status, the operator can be informed of progress of the preheating while waiting for the mobile platform 100A to be ready. Thus, user experience can be advantageously improved.

Figure 19:
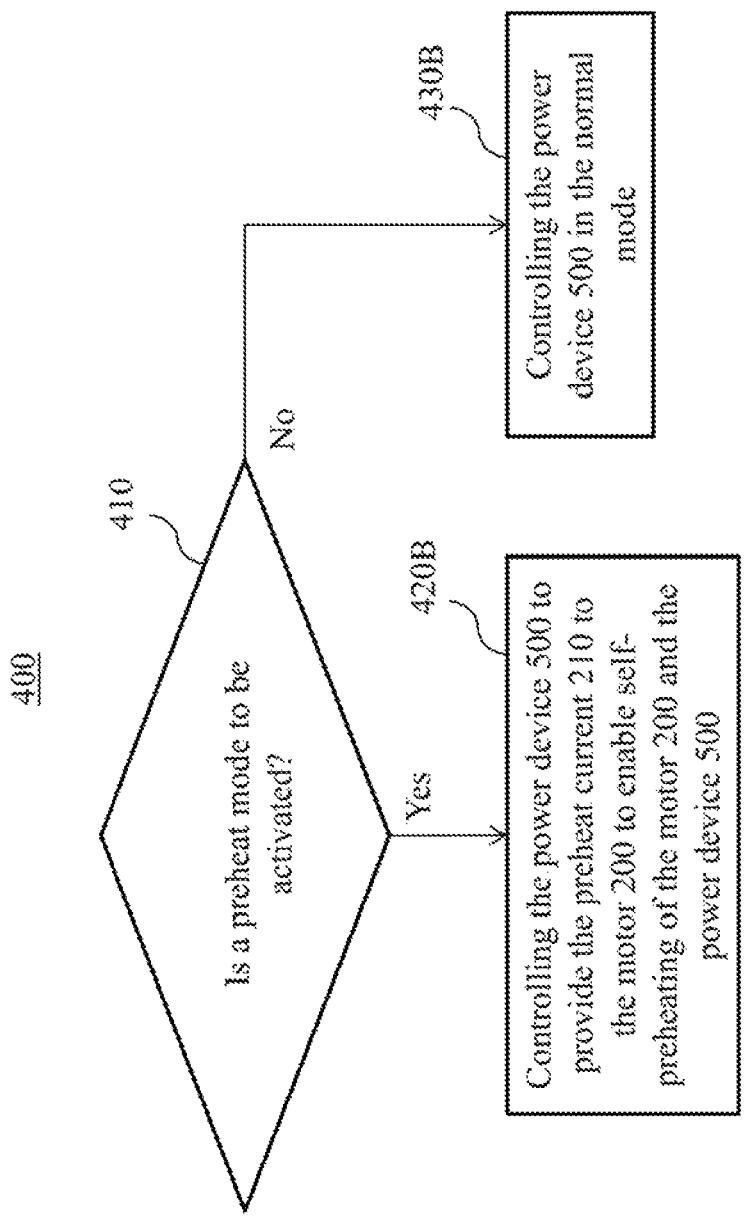
FIG. 19 is an exemplary flow chart illustrating another alternative embodiment of the method of FIG. 3, wherein the controller can control a preheat current for the motor and a power device to self-preheat.

Turning to FIG. 19, another alternative embodiment of the method 400 is shown. Whether to activate a preheat mode can be determined, at 410. Whether to activate the preheat mode can be determined based on a temperature $T_P$ of the power device 500. The preheat mode can include a control mode in which the power device 500 and/or the motor 200 can be preheated.

For example, the temperature $T_P$ can be compared with the target temperature $T_N$ (not shown). When the temperature $T_P$ is greater than or equal to the target temperature $T_N$, the power device 500 and/or the motor 200 can operate safely and/or does not need preheating.

When the temperature $T_P$ is less than the target temperature $T_N$, the preheat mode can be activated. As shown in FIG. 19, the power device 500 can be controlled, at 420B, to provide the preheat current 210 to the motor 200, to enable self-preheating of the motor 200 and the power device 500. The motor 200 and the power device 500, for example, can self-preheat simultaneously. Advantageously, preheating of the motor 200 and the power device 500 can thus be expedited.

When the temperature $T_P$ is greater than or equal to the target temperature $T_N$, the preheat mode is not activated. The controller 300 does not preheat the power device 500. Optionally, the power device 500 can be controlled, at 430B, in a normal mode. The normal mode can include a control mode in which the power device 500 is controlled to provide the drive current to the motor 200 to the motor 200.

The controller 300 can obtain the temperature $T_P$ of the power device 500. In one embodiment, the controller 300 can obtain the temperature $T_P$ at least partially based on the environmental temperature $T_E$. For example, the environmental temperature $T_E$ can be obtained by using a temperature sensor located outside the power device 500. An exemplary temperature sensor can include the temperature sensor 350 (shown in FIG. 9).

Figure 20:
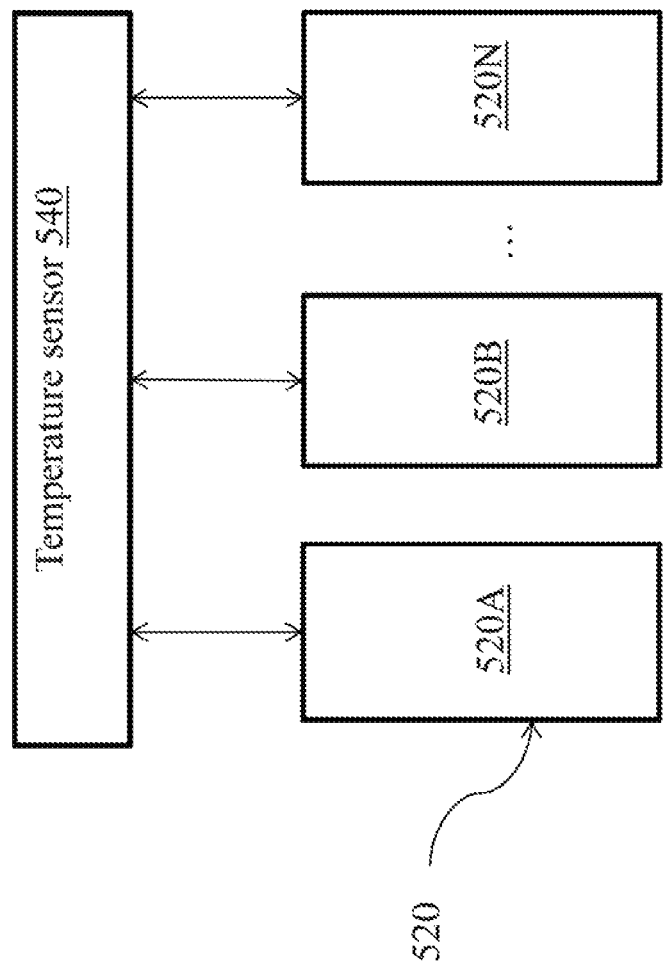
FIG. 20 is an exemplary diagram illustrating an alternative embodiment of the power device of FIG. 19, wherein the power device includes a temperature sensor.

Additionally and/or alternatively, the controller 300 can obtain the temperature $T_P$ at least partially based on an internal temperature of the power device 500. Turning to FIG. 20, an exemplary embodiment of the power device 500 is shown. The power device 500 of FIG. 20 is shown as including a predetermined number of cells 520 including cells 520A, 520B, . . . , 520N. The cells 520 can be any type of battery cells including, but not limited to, lead-acid cells, lithium air cells, lithium-ion cells, nickel-cadmium cells, nickel-metal hydrogen cells and the like. In some embodiments, the power device 500 can include uniform cells 520. The cells 520 can be connected in a series, parallel or a combination of both, so the power device 500 can deliver a preselected voltage, current, capacity, and/or power density.

The power device 500 is shown as including a temperature sensor 540 in proximity to, and/or in contact with, one or more of the cells 520. The temperature sensor 540 can sense the internal temperature of the power device 500. An exemplary internal temperature of the power device 500 can include a surface temperature of the cells 520. For example, the surface temperature can include the surface temperature of one of the cells 520. Alternatively and/or additionally, the surface temperature can include a weighted and/or unweighted average of respective surface temperatures of two or more of the cells 520.

Although FIG. 20 shows the power device 500 as including one temperature sensor 540 for illustratively purposes only, the power device 500 can include any predetermined number of uniform and/or different temperature sensors 540. Each of the temperature sensors 540 can sense a temperature of one or more preselected cells 520.

The temperature $T_P$ of the power device 500 can be obtained based on the environmental temperature $T_E$, the internal temperature of the power device 500, or a combination thereof. For example, the temperature $T_P$ can be based on a weighted and/or unweighted average of the environmental temperature $T_E$ and the internal temperature. Respective weights associated with the environmental temperature $T_E$ and the internal temperature can be predetermined based on respective accuracies of measuring the environmental temperature $T_E$ and the internal temperature.

Figure 21:
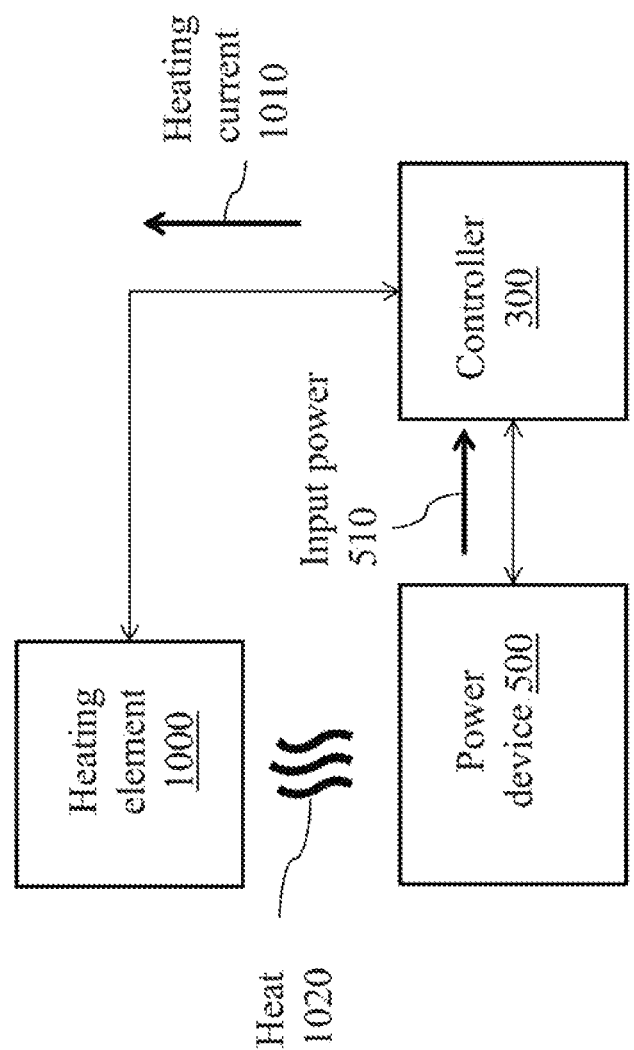
FIG. 21 is an exemplary diagram illustrating another alternative embodiment of the topology of FIG. 5, wherein the topology includes a heating element.

Turning to FIG. 21, the topology is shown as including a heating element 1000 for heating the power device 500. The heating element 1000 can include any suitable device that can convert electricity into heat in any conventional manner, including via resistive heating, Joule heating, and/or Peltier effect. Exemplary heating elements 1000 can include metal heating element, ceramic heating element, polymer positive temperature coefficient (PTC) heating element, composite heating element, or a combination thereof.

The controller 300 can control a heating current 1010 provided to the heating element 1000 for heating the power device 500. The controller 300 can select a heating current 1010 that can increase the temperature $T_P$ of the power device 500 to the target temperature $T_N$ within a target preheat duration. As shown in FIG. 21, the heating element 1000 can generate heat 1020 to for heating the power device 500.

FIG. 21 shows the controller 300 as drawing the input current 510 from the power device 500 and/or directly providing the heating current 1010 to the heating element 100. However, the controller 300 can control an intermediate system (not shown) to provide the heating current 1010 to the heating element 1000.

In one embodiment, the controller 300 can control the preheat current 210 and the heating current 1010 simultaneously. For example, when the preheat current 210 is insufficient for achieving a required temperature increase for the power device 500, the controller 300 can control the heating current 1010 for the power device 500 to self-preheat more efficiently.

The heating element 1000 can be located in proximity with the power device 500. If installed aboard a mobile platform 100A, for example, the mobile platform 100A can form a power device chamber (not shown) in which the power device 500 can be situated. The heating element 1000 can be co-located in the power device chamber with the power device 500. In another example, the heating element 1000 can be located inside the power device 500.

Figure 22:
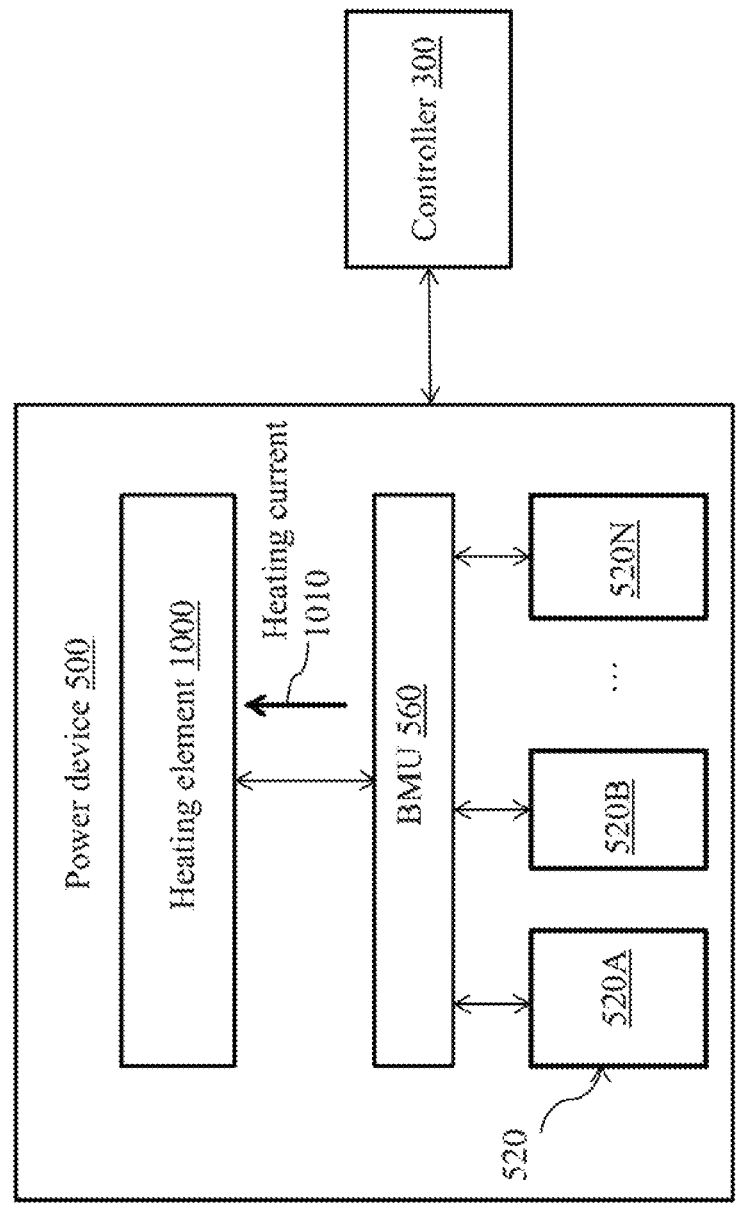
FIG. 22 is an exemplary diagram illustrating an alternative embodiment of the topology of FIG. 21, wherein the heating element is located within the power device.

Turning to FIG. 22, the power device 500 can include a battery management unit (BMU) 560. The BMU 400 can be coupled with at least one cell 520 of the power device 500. In certain embodiments, the BMU 560 can be coupled with one or more selected cells 520. Optionally, the BMU 560 can be coupled with each of the cells 520. The BMU 560 can communicate with the controller 300 and selectively switch on and/or off the cells 520 for delivering the heating current 1010 based on instruction from the controller 300.

FIG. 22 shows the heating element 1000 as being situated within the power device 500. The BMU 560 can provide the heating current 1010 to the heating element 1000 for the heating element 1000 to heat the cells 520.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for controlling a motor configured to provide propulsion for a mobile platform, the method comprising:
   determining whether to activate a preheat mode based on a temperature of a motor; and
   upon determining to activate the preheat mode, controlling a preheat current provided to the motor to enable self-preheating of the motor, the preheat current including a D-axis current, wherein:
      the D-axis current is calculated using a proportional gain and an integral gain of a proportional-integral (IP) model based on the temperature of the motor;
      the proportion gain is determined by controlling the self-preheating of the motor individually using a plurality of proportion gains, and selecting one of the plurality of proportion gains that raises the temperature of the motor to a steady state within a predetermined first time duration; and
      the integral gain is determined by controlling the self-preheating of the motor individually using a plurality of integral gains and the proportion gain, and selecting one of the plurality of integral gains that raises the temperature of the motor to a target temperature at the steady state within a predetermined second time duration.

2. The method of claim 1, wherein determining whether to activate the preheat mode based on the temperature of the motor includes:
   determining to activate the preheat mode upon determining the temperature of the motor is less than the target temperature; and
   determining not to activate the preheat mode upon determining the temperature of the motor is greater than or equal to the target temperature.

3. The method of claim 1, wherein the preheat current further comprises a Q-axis current.

4. The method of claim 3, wherein the Q-axis current is equal to zero.

5. The method of claim 3, wherein the D-axis current and the Q-axis current are converted to a three-phase supply current via an inverse direct-quadrature-zero transformation.

6. The method of claim 1, wherein the D-axis current is selected to increase the temperature of the motor to the target temperature within a target preheat duration.

7. The method of claim 1, wherein the temperature of the motor is obtained further based on an environmental temperature measured via a temperature sensor.

8. The method of claim 1, further comprising:
   controlling conversion of an input current provided by a power device onboard the mobile platform into the preheat current.

9. The method of claim 8, wherein the power device and the motor are preheated simultaneously.

10. The method of claim 8, wherein the preheat current is less than or equal to a maximum current based on performance parameters of the power device.

11. The method of claim 1, further comprising:
    receiving a preheat request from a remote control device; and
    determining whether to activate the preheat mode in response to the preheat request, including:
       accepting the preheat request upon determining to activate the preheat mode; or
       rejecting the preheat request upon determining not to activate the preheat mode.

12. The method of claim 1, further comprising:
    notifying a remote control device of a preheat status of the motor.

13. The method of claim 1, wherein the mobile platform includes an unmanned aerial vehicle (UAV).

14. The method of claim 1, further comprising:
    obtaining the temperature of the motor based on a resistance of the motor and a temperature-resistance correlation of the motor.

15. A system for controlling a motor configured to provide propulsion for a mobile platform, the system comprising:
    a controller configured to:
       determine whether to activate a preheat mode based on a temperature of a motor; and
       upon determining to activate the preheat mode, control a preheat current provided to the motor to enable self-preheating of the motor, the preheat current including a D-axis current, wherein:
          the D-axis current is calculated using a proportional gain and an integral gain of a proportional-integral (IP) model based on the temperature of the motor;
          the proportion gain is determined by controlling the self-preheating of the motor individually using a plurality of proportion gains, and selecting one of the plurality of proportion gains that raises the temperature of the motor to a steady state within a predetermined first time duration; and
          the integral gain is determined by controlling the self-preheating of the motor individually using a plurality of integral gains and the proportion gain, and selecting one of the plurality of integral gains that raises the temperature of the motor to a target temperature at the steady state within a predetermined second time duration.

16. A mobile platform comprising:
a motor configured to provide propulsion for the mobile platform; and
a controller configured to:
   determine whether to activate a preheat mode based on the obtained a temperature of a motor; and
upon determining to activate the preheat mode, control a preheat current provided to the motor to enable self-preheating of the motor, the preheat current including a D-axis current, wherein:
   the D-axis current is calculated using a proportional gain and an integral gain of a proportional-integral (IP) model based on the temperature of the motor;
   the proportion gain is determined by controlling the self-preheating of the motor individually using a plurality of proportion gains, and selecting one of the plurality of proportion gains that raises the temperature of the motor to a steady state within a predetermined first time duration; and
   the integral gain is determined by controlling the self-preheating of the motor individually using a plurality of integral gains and the proportion gain, and selecting one of the plurality of integral gains that raises the temperature of the motor to a target temperature at the steady state within a predetermined second time duration.

* * * * *